US012574780B2

(12) United States Patent
Xu et al.

(10) Patent No.: US 12,574,780 B2
(45) Date of Patent: Mar. 10, 2026

(54) PREEMPTION OF CROSS LINK INTERFERENCE RESOURCE

(71) Applicant: QUALCOMM Incorporated, San Diego, CA (US)

(72) Inventors: Huilin Xu, Temecula, CA (US); Diana Maamari, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 18/188,900

(22) Filed: Mar. 23, 2023

(65) Prior Publication Data

US 2024/0323731 A1    Sep. 26, 2024

(51) Int. Cl.
*H04W 24/10* (2009.01)
*H04B 17/336* (2015.01)

(52) U.S. Cl.
CPC .......... *H04W 24/10* (2013.01); *H04B 17/336* (2015.01)

(58) Field of Classification Search
CPC ............................. H04W 24/10; H04B 17/336
See application file for complete search history.

(56) References Cited

U.S. PATENT DOCUMENTS

| | | | |
|---|---|---|---|
| 12,335,988 B2 * | 6/2025 | Ma ......................... | H04L 5/006 |
| 2019/0327687 A1 * | 10/2019 | Wang ................ | H04W 72/0473 |
| 2022/0021507 A1 * | 1/2022 | Cao ....................... | H04L 5/0091 |
| 2023/0007515 A1 * | 1/2023 | Xu ......................... | H04W 72/23 |
| 2023/0070642 A1 * | 3/2023 | Ma ......................... | H04L 5/0094 |
| 2023/0156743 A1 * | 5/2023 | Seok ...................... | H04L 5/0094 |
| | | | 370/329 |
| 2023/0300868 A1 * | 9/2023 | Ma ....................... | H04B 17/345 |
| | | | 370/252 |

\* cited by examiner

*Primary Examiner* — Zhiren Qin
(74) *Attorney, Agent, or Firm* — ArentFox Schiff, LLP

(57) ABSTRACT

This disclosure provides methods, components, devices and systems for preemption of CLI measurement and filtering in a CLI measurement resource. Some aspects more specifically relate to skipping measurement or filtering of CLI in response to a dynamic signal. In some examples, a base station may send a first UE a dynamic signal indicating the first UE is not to measure or filter CLI from a second UE in a CLI measurement resource indicated in the dynamic signal. The CLI measurement resource may be previously configured in a CLI resource configuration, such as an RRC configuration indicating time-frequency resources associated with a CLI-RSSI resource or an SRS resource, and the dynamic signal may indicate one or more of these time-frequency resources in which the UE is to skip measuring or filtering CLI. After receiving the dynamic signal, the UE may skip measuring or filtering CLI in the indicated resources.

28 Claims, 11 Drawing Sheets

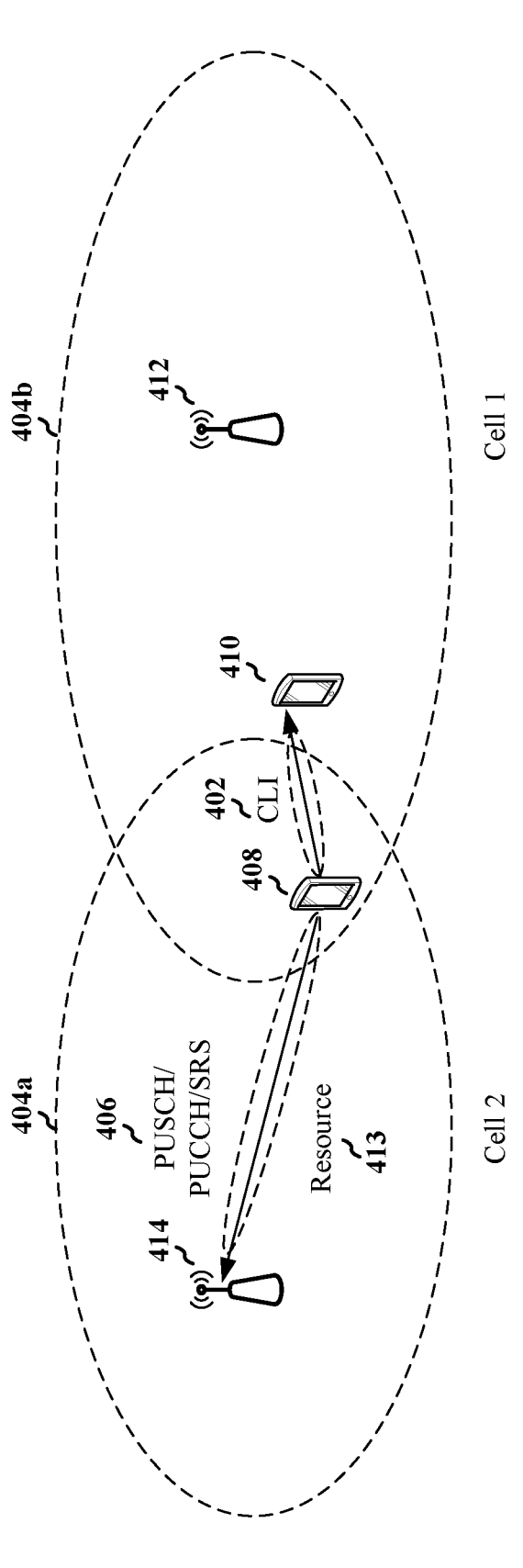
FIG. 4

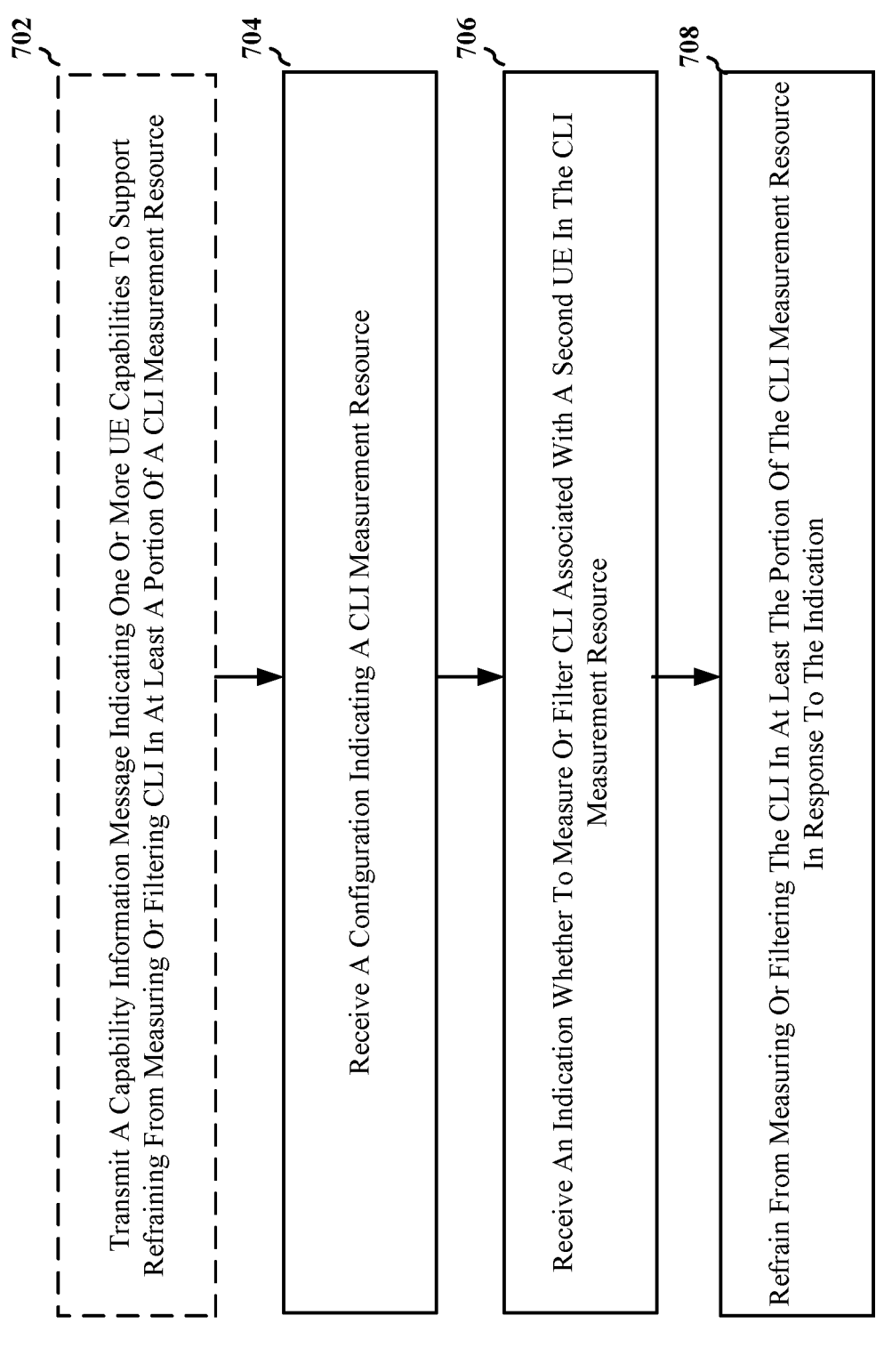

702 Transmit A Capability Information Message Indicating One Or More UE Capabilities To Support Refraining From Measuring Or Filtering CLI In At Least A Portion Of A CLI Measurement Resource 704 Receive A Configuration Indicating A CLI Measurement Resource 706 Receive An Indication Whether To Measure Or Filter CLI Associated With A Second UE In The CLI Measurement Resource 708 Refrain From Measuring Or Filtering The CLI In At Least The Portion Of The CLI Measurement Resource In Response To The Indication

PREEMPTION OF CROSS LINK INTERFERENCE RESOURCE

TECHNICAL FIELD

The present disclosure generally relates to wireless communication, and more particularly, to a wireless communication system providing preemption of cross link interference (CLI) measurement and filtering in a CLI measurement resource.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented in a method for wireless communication performable at a first user equipment (UE). The method includes receiving a configuration indicating a cross link interference (CLI) measurement resource, receiving an indication whether to measure or filter CLI associated with a second UE in the CLI measurement resource, and refraining from measuring or filtering the CLI in at least a portion of the CLI measurement resource in response to the indication.

Another innovative aspect of the subject matter described in this disclosure can be implemented in an apparatus for wireless communication, such as a first UE. The apparatus includes a memory, and a processor communicatively coupled with the memory. The processor is operable to cause the apparatus to receive a configuration indicating a CLI measurement resource, receive an indication whether to measure or filter CLI associated with a UE in the CLI measurement resource, and refrain from measuring or filtering the CLI in at least a portion of the CLI measurement resource in response to the indication.

In some examples of the methods and apparatuses, refraining from measuring or filtering the CLI in the at least the portion of the CLI measurement resource includes refraining from measuring or filtering the CLI in an entirety of the CLI measurement resource.

In some examples of the methods and apparatuses, refraining from measuring or filtering the CLI in the at least the portion of the CLI measurement resource includes refraining from measuring or filtering the CLI in one or more groups of symbols of the CLI measurement resource over an entire bandwidth of the CLI measurement resource, the indication identifying the one or more groups of symbols.

In some examples of the methods and apparatuses, refraining from measuring or filtering the CLI in the at least the portion of the CLI measurement resource includes refraining from measuring or filtering the CLI in a set of symbols of the CLI measurement resource over one or more groups of RBs in the CLI measurement resource, the indication identifying the one or more groups of RBs.

In some examples, the methods and apparatuses may transmit a capability information message indicating one or more UE capabilities to support refraining from measuring or filtering the CLI in the at least the portion of the CLI measurement resource.

Another innovative aspect of the subject matter described in this disclosure can be implemented in a method for wireless communication performable at a network entity. The method includes transmitting a configuration indicating a CLI measurement resource, transmitting an indication whether a first UE is to measure or filter CLI associated with a second UE in the CLI measurement resource, and receiving, from the first UE, a CLI measurement associated with at least a portion of the CLI measurement resource, the CLI measurement excluding the CLI in a remainder of the CLI measurement resource in response to the indication.

Another innovative aspect of the subject matter described in this disclosure can be implemented in an apparatus for wireless communication, such as a network entity. The apparatus includes a memory and a processor communicatively coupled with the memory. The processor is operable to cause the apparatus to transmit a configuration indicating a CLI measurement resource, transmit an indication whether a first UE is to measure or filter CLI associated with a second UE in the CLI measurement resource, and receive, from the first UE, a CLI measurement associated with at least a portion of the CLI measurement resource, the CLI measurement excluding the CLI in a remainder of the CLI measurement resource in response to the indication.

In some examples of the methods and apparatuses, the remainder of the CLI measurement resource corresponds to an unused resource of the second UE at least for a physical uplink shared channel (PUSCH) transmission, a physical uplink control channel (PUCCH) transmission, or a sounding reference signal (SRS) transmission of the second UE.

In some examples of the methods and apparatuses, the indication is of whether to measure or filter the CLI in one or more groups of symbols of the CLI measurement resource over one or more groups of resource blocks (RBs) in the CLI measurement resource, and the indication identifies the one or more groups of symbols and the one or more groups of RBs.

In some examples of the methods and apparatuses, the receiving the CLI measurement from the first UE associated with the at least the portion of the CLI measurement resource includes: receiving a measurement including the CLI associated with one or more groups of symbols of the CLI measurement resource over an entire bandwidth of the CLI measurement resource, the indication identifying one or more other groups of symbols for the first UE to exclude in the CLI measurement.

In some examples of the methods and apparatuses, the receiving the CLI measurement from the first UE associated with the at least the portion of the CLI measurement resource includes: receiving a measurement including the CLI associated with a set of symbols of the CLI measurement resource over one or more groups of RBs in the CLI measurement resource, the indication identifying one or more other groups of RBs for the first UE to exclude in the CLI measurement.

In some examples, the methods and apparatuses may receive a capability information message indicating one or more capabilities of the first UE to support refraining from measuring or filtering the CLI in the CLI measurement resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating an example of cross link interference (CLI).

FIG. 7 is a flowchart of a method of wireless communication at a UE.

DETAILED DESCRIPTION

Figure 1A:
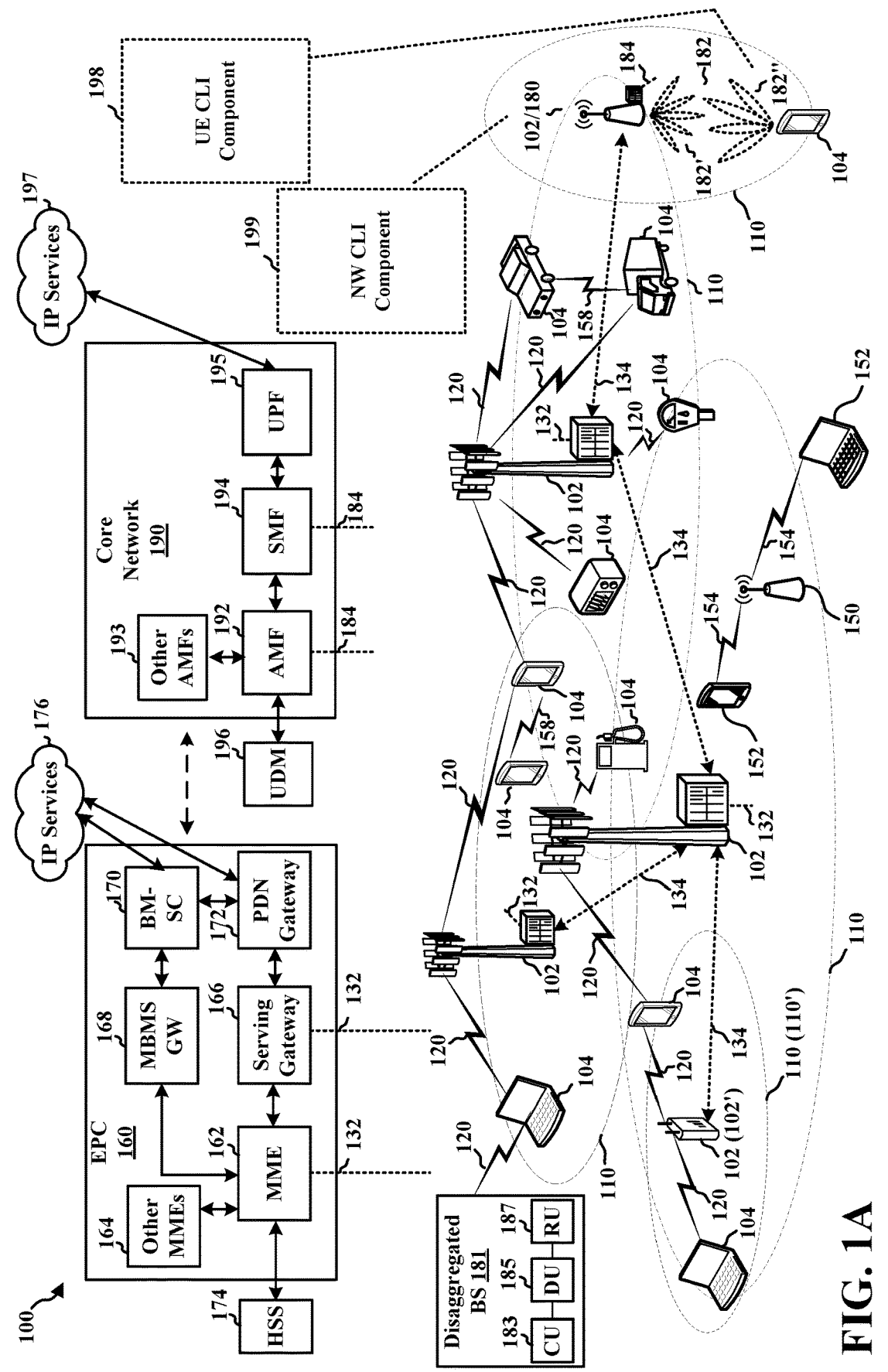
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate generally to wireless communication, and more specifically to preemption of cross link interference (CLI) measurement and filtering in a CLI measurement resource. The base station may send a first UE a dynamic signal indicating the first UE is not to measure or filter CLI from a second UE in a CLI measurement resource indicated in the dynamic signal. The dynamic signal may be, for example, downlink control information (DCI) or a medium access control (MAC) control element (MAC-CE). For example, the base station may inform the first UE via DCI or MAC-CE to skip CLI measurements or filtering in a CLI measurement resource corresponding to an unused resource for uplink transmissions of a second UE. In the case of DCI, the indication may reuse the DCI formats for downlink preemption or uplink preemption, or the indication may be carried in a separate DCI format. In one example, the base station may indicate the first UE to refrain from measuring CLI in corresponding CLI measurement resource(s) via corresponding bit value(s) for those resource(s). The indication may be performed in a comparable manner to downlink preemption or uplink cancellation. For example, the base station may indicate one or more groups of symbols and resource blocks (RBs) which the first UE is to refrain from measuring or filtering CLI. These indicated symbols and resource blocks may be over an entire, configured CLI measurement occasion (a coarse resource granularity), over a subset of symbols in an entire bandwidth of the CLI measurement occasion (a medium resource granularity), or over a subset of symbols and RBs in the CLI measurement occasion (a fine resource granularity). In another example, after receiving an indication of a subset of symbols and RBs in a CLI measurement occasion, the UE may skip measuring or filtering CLI in either the indicated RBs over the full set of symbols in the CLI measurement occasion, in the indicated symbols over the entire bandwidth of the CLI measurement occasion, or in the entire CLI measurement occasion, depending on the configured behavior of the UE. The indicated symbols and RBs may be in previously received and buffered resources (akin to those indicated in downlink preemption), or in upcoming resources (akin to those indicated in uplink cancellation). The UE may also provide a capability information message to the base station indicating whether the UE is capable of supporting reception and processing of the indication to skip CLI measurements or filtering, and the base station may send the indication in response to determining the UE has such capability.

Particular aspects of the subject matter described in this disclosure can be implemented to realize one or more of the following potential advantages. In response to receiving the dynamic signal indicating to skip CLI measurements or filtering in the CLI measurement resource corresponding to an unused resource for uplink transmissions of the second UE, the first UE may refrain from measuring or filtering CLI in resources that do not include actual interference from the second UE. As a result, the first UE may provide more accurate CLI measurement reports, and power savings may be provided at the first UE since the UE may not consume unnecessary power measuring these resources for non-existent CLI. If the dynamic signal is a DCI which indicate a fine resource granularity, namely, a specific group or subset of symbols over a specific group or subset of RBs of the CLI measurement resource, the dynamic signal may be configured with minimal changes to DCI formatting in response to following the format of a downlink preemption DCI or an uplink cancellation DCI. Moreover, applying a fine resource granularity may effectively allow the base station to similarly apply a coarse or medium resource granularity in its dynamic signaling, providing flexibility in the various symbols and RBs over which the UE may be indicated to skip CLI measurements or filtering. Furthermore, even if the base station dynamically indicates the first UE to not measure CLI in one or multiple symbols and one or multiple RBs contained within the CLI measurement occasion when applying the fine resource granularity, if the UE's configured behavior is accounted for in determining whether it may or may not follow the indicated RB—symbol group pairs, then the dynamic signaling may be supported in a broad range of situations. For example, dynamic signaling may be supported depending on UE capability or behavior in cases such as where the UE is a reduced capability UE, where the UE intends to perform low complexity operations, where the second UE's unused resource corresponds to an uplink transmission having an orthogonal sequence, and where the first UE intends to perform CLI measurements solely in the time domain but not the frequency domain (or vice-versa). Additionally, if the dynamic signal follows the same format as a DCI used for downlink preemption or uplink cancellation, but a radio network temporary identifier (RNTI) associated with the dynamic signal is different than the RNTIs associated with downlink preemption and uplink preemption, the first UE may easily be able to differentiate the dynamic signal from other DCI formats and skip CLI measurements accordingly. This separation of RNTIs between downlink preemption and uplink cancellation DCIs from CLI measurement-related DCIs may also provide backwards compatibility for UEs that are not capable of processing such CLI measurement-related DCIs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102′ may have a coverage area 110′ that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102′ may operate in a licensed and/or an unlicensed frequency spectrum. When operating in an unlicensed frequency spectrum, the small cell 102′ may employ NR and use the same unlicensed frequency spectrum (e.g., 5 GHZ, or the like) as used by the Wi-Fi AP 150. The small cell 102′, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102′ or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182′. The UE 104 may receive the beamformed signal from the base station 180 in one or more receive directions 182″. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUS)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1A, in certain aspects, the UE 104 may include a UE CLI component 198 that is configured to receive a configuration indicating a CLI measurement resource; receive an indication whether to measure or filter CLI associated with a second UE in the CLI measurement resource; and refrain from measuring or filtering the CLI in at least a portion of the CLI measurement resource in response to the indication.

In certain aspects, the base station 102/180 (or other network entity with base station functionality) may include a NW CLI component 199 that is configured to transmit a configuration indicating a CLI measurement resource; transmit an indication whether a first UE is to measure or filter CLI associated with a second UE in the CLI measurement resource; and receive, from the first UE, a CLI measurement associated with at least a portion of the CLI measurement resource, the CLI measurement excluding the CLI in a remainder of the CLI measurement resource in response to the indication.

Figure 1B:
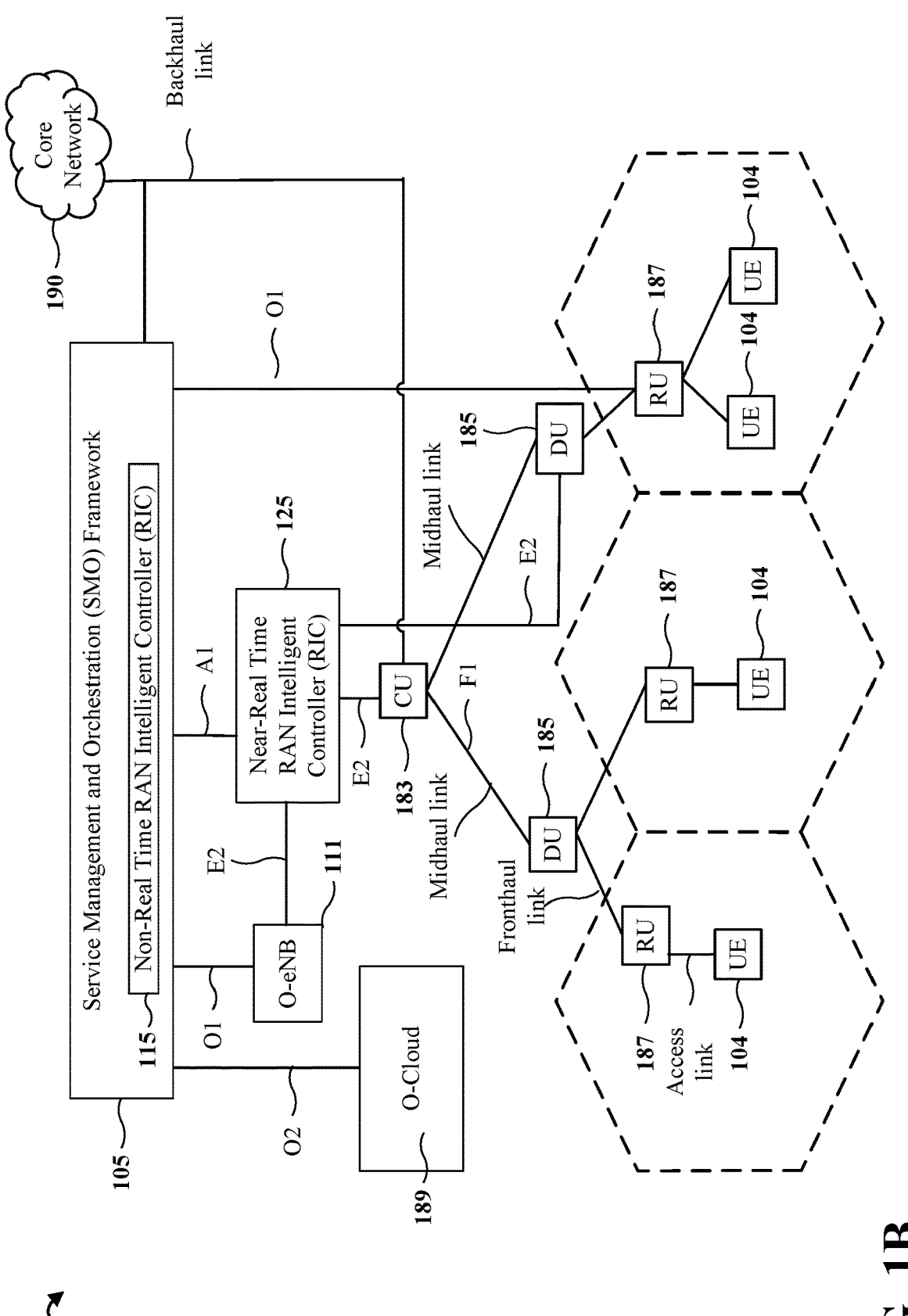
FIG. 1B shows a diagram illustrating an example disaggregated base station architecture.

FIG. 1B shows a diagram illustrating an example disaggregated base station 181 architecture. The disaggregated base station 181 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUS 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

Figures 2A, 2B, 2C, 2D:
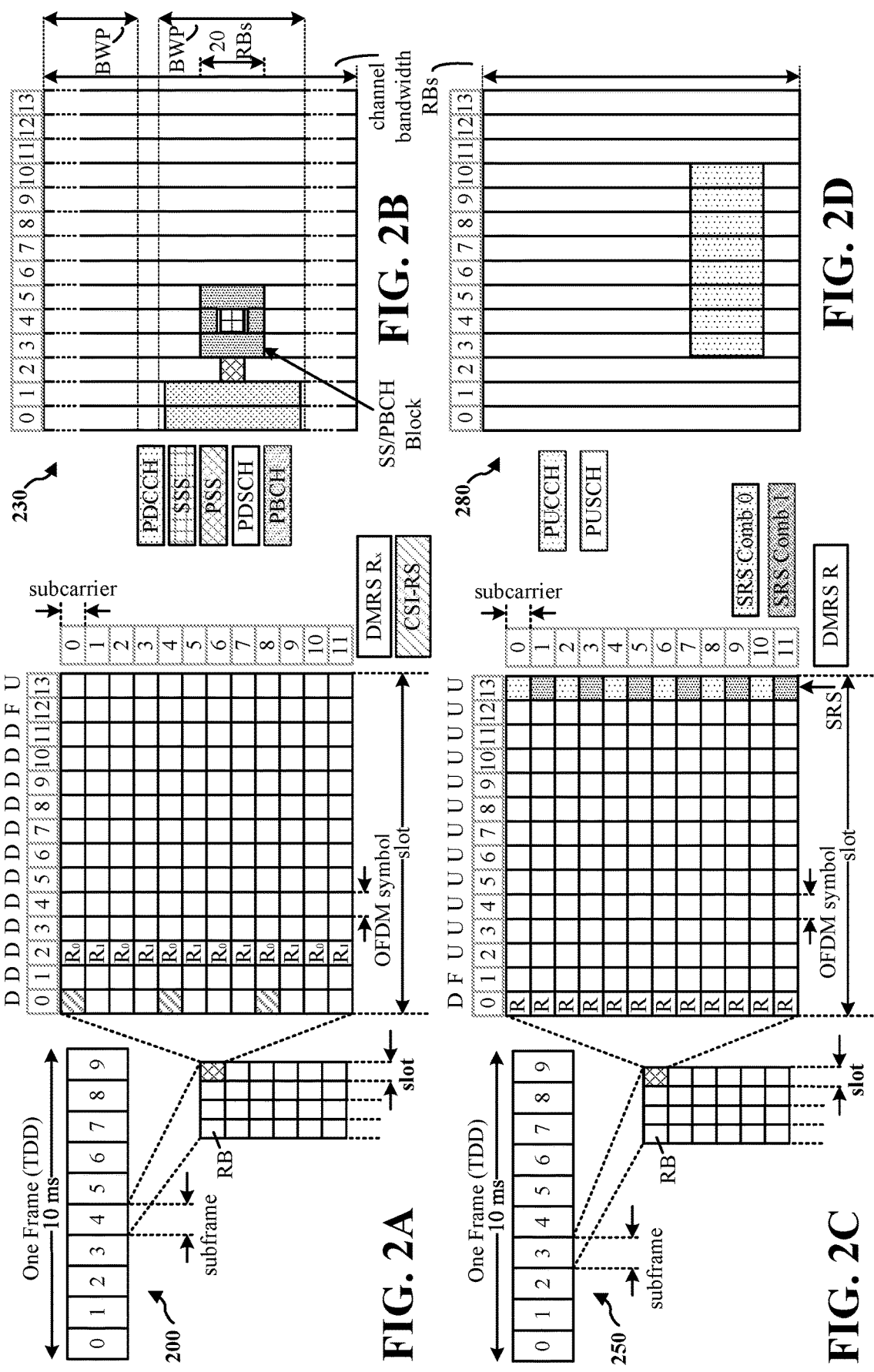
FIG. 2A is a diagram illustrating an example of a first subframe within a 5G NR frame structure.
FIG. 2B is a diagram illustrating an example of DL channels within a 5G NR subframe.
FIG. 2C is a diagram illustrating an example of a second subframe within a 5G NR frame structure.
FIG. 2D is a diagram illustrating an example of UL channels within a 5G NR subframe.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^\mu*15$ kilohertz (kHz), where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
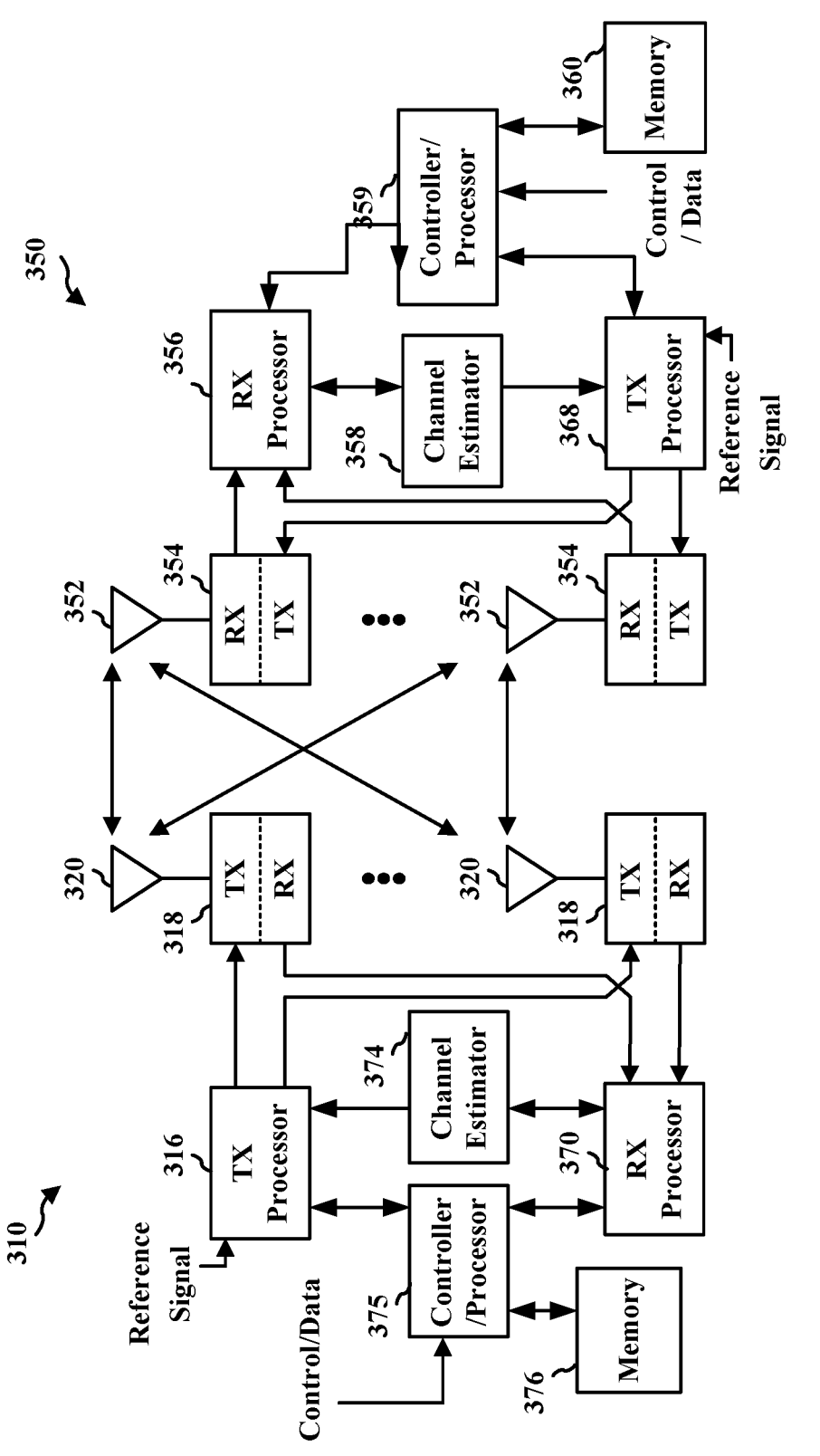
FIG. 3 is a block diagram of a base station (BS) in communication with a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate physical channels, matching, mapping onto modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE CLI component 198 of FIG. 1A.

At least one of the TX processor 316, the RX processor 370, and the controller/processor 375 may be configured to perform aspects in connection with NW CLI component 199 of FIG. 1A.

FIG. 4 illustrates an example 400 of CLI 402. CLI measurements provide a mechanism for a first UE experiencing interference from a second UE to measure the strength of the interference via the second UE's uplink signals. CLI 402 may occur between two UEs, for example, in the case where UEs residing in a same cell (or in different cells 404a, 404b) are respectively configured with a time division duplexing (TDD) slot format that results in an uplink symbol of one UE overlapping with a downlink symbol of another UE. In such case, an uplink transmission 406 of the second UE, namely an aggressor UE 408, may interfere with downlink reception of the first UE, namely a victim UE 410.

To allow a base station 412 serving the victim UE 410 to be informed of this CLI 402, and therefore be induced to avoid scheduling future downlink transmissions that result in CLI 402 with the aggressor UE 408, the base station 412 may configure a CLI measurement resource for the victim UE 410. For example, the base station may configure a sounding reference signal (SRS) resource or a CLI received signal strength indicator (CLI-RSSI) resource for the victim UE 410 including a number of physical resource blocks or bandwidth part, a number of symbols, a periodicity and offset, or other parameters. The SRS resource may be a coherent resource corresponding to a resource 413 for an SRS which the aggressor UE 408 sends to a base station 414 for uplink channel sounding, while the CLI-RSSI may be a non-coherent resource corresponding to the resource 413 for a PUSCH, PUCCH, or other uplink transmission 406 which total signal strength the victim UE 410 is to measure and normalize by its configured bandwidth. In response to receiving the CLI measurement resource configuration, the victim UE 410 may measure CLI 402 in the configured resource, for example, a reference signal received power (RSRP) in the SRS resource or an RSSI in the CLI-RSSI resource. The victim UE 410 may also continuously perform layer 3 filtering on CLI measurement results over configured CLI measurement occasions, in order to take into account changes in channel, surrounding environment, transmission power, direction, or other factors that could destabilize instantaneous, unfiltered measurements. For example, the victim UE 410 may perform layer 3 filtering in accordance with Equation (1):

$$F_n = (1 - a) * F_{n-1} + a * M_n \qquad (1)$$

where $M_n$ is the latest received measurement result (the nth instantaneous CLI measurement) from the physical layer, $F_n$ is the updated filtered measurement result (the nth filtered CLI measurement), $F_{n-1}$ is the prior filtered measurement result, where $F_0$ is set to $M_1$ when the first measurement result from the physical layer is received, and a is a value calculated based on a configured filter coefficient for the corresponding measurement.

After obtaining the CLI measurements or filtered CLI measurements, the victim UE 410 may report the CLI measurement to the base station 412 either periodically or in response to an event trigger. For example, if the victim UE 410 is event triggered to report SRS-RSRP or CLI-RSSI in response to a trigger quantity or threshold being met (indicating significant performance degradation due to CLI), the victim UE may report its layer 3 filtered measurement results of the CLI resource. In response to the CLI measurement results, the base station 412 may adapt its scheduling of the victim UE 410 to no longer coincide with the transmissions of aggressor UE 408.

However, even if the base station 412 configures a CLI measurement resource for the victim UE 410 including time and frequency occasions corresponding to SRS, PUSCH, PUCCH, or other uplink transmissions 406 of the aggressor UE 408, the aggressor UE 408 may not necessarily provide such uplink transmissions 406 to the base station 414 in the resource 413 during a CLI measurement occasion. In other words, there may not actually be interference at the time or frequency resources in which the victim UE 410 is performing the CLI measurements and layer 3 filtering. For example, even though the aggressor UE 408 may be scheduled to provide an SRS, PUSCH, PUCCH, or other uplink transmission 406 in resource 413 during the CLI measurement resource, the aggressor UE 408 may refrain from performing such transmission in certain occasions if the aggressor UE 408 is operating in a sleep state associated with discontinuous transmission (DTX) during these occasions, has no or insufficient data to transmit, or for some other reason. In such case where resource 413 is unused and thus there is no actual interfering transmission overlapping with the CLI measurement resource, the victim UE 410 may obtain an inaccurate, under-estimation of CLI 402 as a result of a very low SRS-RSRP or CLI-RSSI measurement in the CLI measurement resource, and the victim UE 410 may therefore not report this measurement if the measured RSRP or RSSI does not exceed a layer 3 filtering threshold on an event triggered report. Alternatively, if such threshold was configured low enough for the CLI measurement to trigger the victim UE 410 to report this false measurement in its filtered measurement results, the base station 412 may misinterpret the CLI measurement report from the victim UE 410 as indicating the victim UE 410 did not experience interference from a scheduled transmission of the aggressor UE 408.

While such false negatives or alarms may potentially be mitigated by applying a longer filter time constant (i.e., a smaller value of a) to the layer 3 filtering formula of Equation (1) to smooth out variation due to random absence and presence of CLI 402, this approach may cause the CLI report to become less sensitive to actual CLI strength. Instead, a better approach may be for the aggressor UE 408 to inform the base station 412 or base station 414 via dynamic signaling whether or not the aggressor UE 408 will transmit SRS, PUSCH, PUCCH, or other UL signal in the resource 413 corresponding to the CLI measurement resource. Such dynamic signaling may be applied, for example, in the use case of extended reality (XR), where a UE may send a base station via uplink control information (UCI) an indication or declaration of one or more unused, configured grant, PUSCH transmission occasions for an uplink video transmission, such as to address video frame size variation or potential uplink jitter.

Therefore, it would be helpful if, in the case where the aggressor UE 408 provides to the base station 412 or base station 414 information regarding an unused resource associated with SRS, PUSCH, PUCCH, or other UL transmission, the base station 412 indicates this information to the victim UE 410, so that the victim UE 410 may skip (refrain from) performing or filtering the instantaneous CLI measurement in the corresponding CLI measurement occasion which lacks actual CLI. For instance, if the base station 412 or base station 414 configures a plurality of configured grant PUSCH occasions for XR content, and if the aggressor UE 408 informs the base station 412 or base station 414 of its intent not to use one or more of these occasions before the initial PUSCH occasion begins, the base station 412 may inform the victim UE 410 in the same cell of these occasions so that the victim UE 410 may avoid wasting resources measuring unnecessary occasions. If the victim UE 410 is alternatively in a different cell 404*a*, 404*b* than the aggressor UE 408, the base station 414 serving the aggressor UE 408 may forward the unused resource information to the base station 412 serving the victim UE 410 (for example, via a backhaul link), and the base station 412 serving the victim UE 410 may subsequently inform the victim UE 410 to skip CLI measuring or filtering corresponding to the aggressor UE's unused occasion.

Moreover, it would be helpful for the base station 412 to inform the victim UE 410 to skip CLI measurements or filtering in CLI measurement resources corresponding to unused resources 413 or occasions even in the case where the aggressor UE 408 does not expressly provide information regarding these unused resources 413 to the base station 412 or base station 414. For example, if the base station 412 or 414 fails an attempt to blindly detect a demodulation reference signal (DMRS) in a previously configured or scheduled resource of the aggressor UE 408, the base station 412 or 414 may determine this resource is unused, and thus the base station 412 may inform the victim UE 410 to skip measuring or filtering CLI 402 in a CLI measurement resource corresponding to the unused resource 413. In either case, the base station 412 or base station 414 may also determine to reclaim and relocate this unused resource 413 to another UE that may be in a different beam direction or that otherwise may have less likelihood of causing CLI 402 to the victim UE 410, or alternatively the base station 412 or base station 414 may determine not to reallocate this unused resource when no transmission is pending from another UE. In either case, the base station 412 may indicate the victim UE 410 to skip the indicated CLI measurement occasions without informing the victim UE 410 of the base station's or aggressor UE's information motivating such indication to skip.

Figure 5:
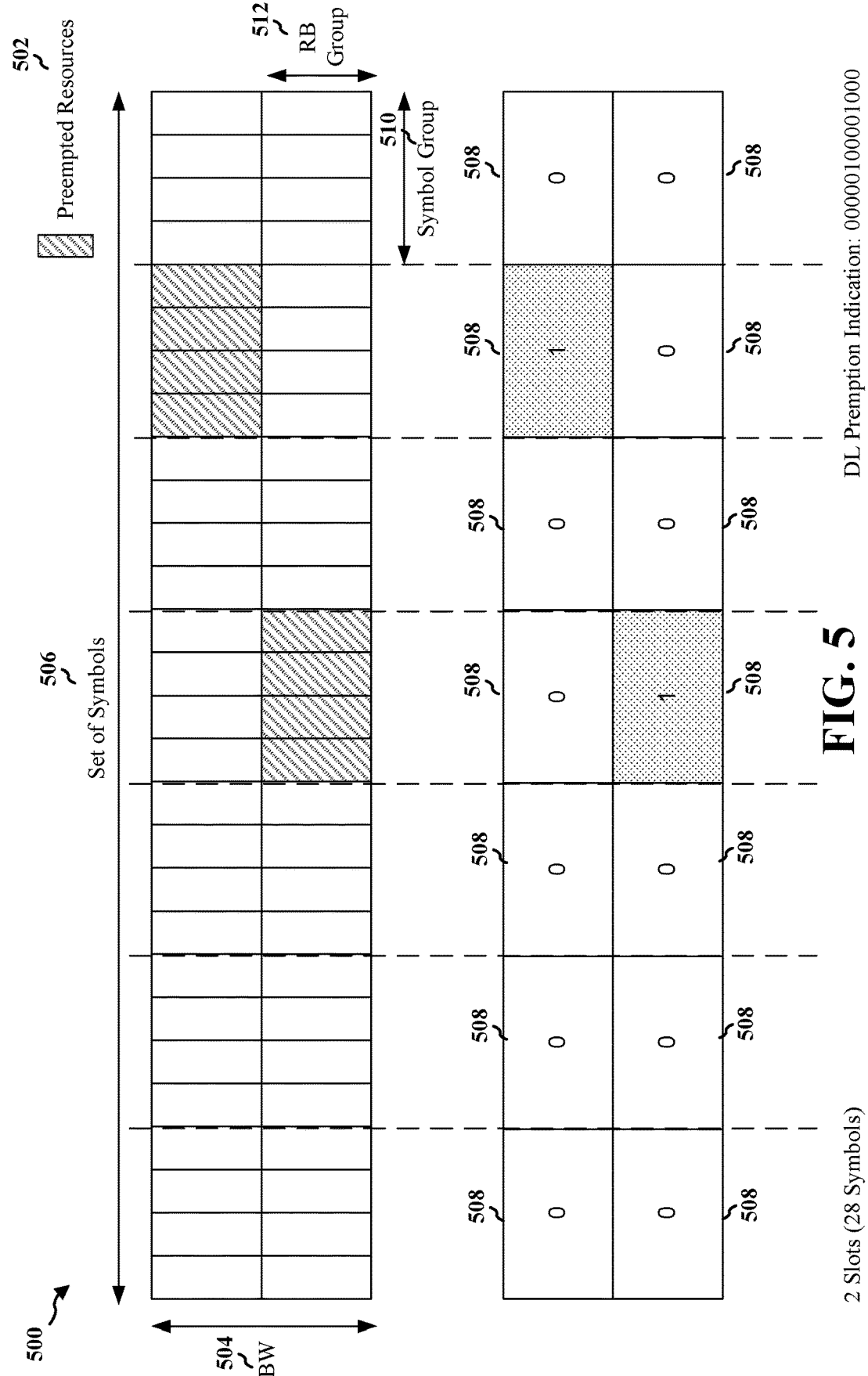
FIG. 5 is a diagram illustrating an example of downlink preemption.

One approach that a base station may apply to indicate a UE to skip performing a certain action, at least in the context of downlink reception, is downlink preemption. FIG. 5 illustrates an example 500 of downlink preemption. In particular, a base station may provide an interrupted transmission indication to a UE in a group of UEs, via DCI format 2_1, of time-frequency resources 502 where the UE may assume that no transmission to the UE is present in physical resource blocks (PRBs) and in OFDM symbols indicated by the time-frequency resources 502. The indicated PRBs and OFDM symbols are from a bandwidth 504, or set of PRBs, and a set of symbols 506 in a last PDCCH monitoring period, namely, the set of symbols 506 prior to the first symbol of the PDCCH reception carrying the DCI within the duration of the PDCCH monitoring periodicity for the DCI. The PDCCH conveying the DCI format 2_1 may also be associated with a cyclic redundancy check (CRC) scrambled by an interruption radio network temporary identifier (INT-RNTI). The DCI format 2_1 may include a sequence of bits 508, for example 14 bits, where each bit indicates the presence or absence of a downlink transmission in an associated group 510 of consecutive symbols over the entire, active bandwidth 504 or PRBs, or over a subset or group 512 of PRBs such as half the active bandwidth 504 or PRBs. For example, the DCI may be configured such that 14 bits (which are from MSB of a field in the DCI) have a one-to-one mapping with 14 groups of consecutive symbols from the set of symbols 506. Alternatively, the DCI may be configured as illustrated in FIG. 5 such that 7 pairs of these bits 508 have a one-to-one mapping with 7 groups of consecutive symbols, where a first bit in a pair (column) of bits for a symbol group is applicable to a subset of first PRBs from a set of PRBs or bandwidth 504, and a second bit in the pair (column) of bits for the symbol group is applicable to a subset of last PRBs from the set of PRBs or bandwidth 504. If the UE detects a bit value of 1 in one or more of these bits 508, the DCI format 2_1 indicates no transmission to the UE in the symbol group(s) 510 and, if configured, the subset(s) or group(s) 512 of PRBs, respectively corresponding to those bit(s), and thus that these time-frequency resources 502 are unused. In contrast, a bit value of 0 indicates a scheduled transmission to the UE in the corresponding symbol group 510, and if configured, the subset or group 512 of PRBs, is not preempted, and thus that these resources are used for the scheduled transmission to the UE.

Similarly, uplink cancellation is another approach that a base station may apply to indicate a UE to skip performing a certain action, in this case uplink transmission. Although an example of uplink cancellation is not illustrated, the concept is similar to that of downlink preemption illustrated in FIG. 5. In particular, a base station may provide an uplink cancellation indication to a UE in a group of UEs, via DCI format 2_4, of the time-frequency resources (similar to resources 502) where the UE is to cancel an SRS transmission, a PUSCH transmission or a repetition of a PUSCH transmission in an indicated group of symbols (similar to symbol group 510) and group of PRBs (similar to RB group 512). The indicated symbols are with reference to an end of a PDCCH reception where the UE detects the DCI format 2_4, and the PDCCH conveying the DCI format 2_4 may also be associated with a CRC scrambled by a cancellation indication RNTI (CI-RNTI). The DCI format 2_4 may include a plurality of bits corresponding to symbols and a plurality of bits corresponding to PRBs (similar to the sequence of bits 508), where each bit indicates whether the uplink transmission is to be cancelled in an associated group of symbols and PRBs.

Thus, using downlink preemption, the base station 102/ 180 may facilitate DL reception at the UE 104 from a serving cell by configuring the UE 104 to skip reception of a PDSCH in the indicated resources of the DCI format 2_1. For example, if the base station 102/180 intends to cancel or reclaim one or more DL resources and assign them to another UE for a more urgent downlink transmission in ultra-reliable low latency communications (URLLC), the base station 102/180 may use DCI format 2_1 to indicate the UE 104 to refrain from receiving a PDSCH in these resource(s) via corresponding bit value(s) of 1 for those resource(s). The base station may indicate the affected resources in terms of an RB-symbol group pair. For instance, in the example of FIG. 5, the base station 102/180 may inform the UE 104 that the UE 104 is to expect not to receive a PDSCH transmission in the indicated RBs and four-symbol groups associated with corresponding bits of '1' out of the 14 bits in the associated field of DCI format 2_1. The samples which the UE 104 previously buffered in the last PDCCH monitoring occasion corresponding to these indicated RB groups 512 and symbol groups 510 may then be discarded, while the other samples corresponding to the remaining RB groups and symbol groups may be decoded for PDSCH based on the PDCCH. Likewise, using uplink cancellation, if the base station base stations 102/180 intends for the UE 104 to cancel an SRS or PUSCH transmission in one or more UL resources, the base station 102/180 may use DCI format 2_4 to indicate the UE 104 to cancel the upcoming transmission in these resource(s) via corresponding bit value(s) for those resource(s).

Similarly with respect to CLI 402, if the aggressor UE 408 intends to dynamically cancel SRS, PUSCH, PUCCH or other uplink transmission 406 in one or more configured or scheduled UL resources due to DTX, due to the aggressor UE having no or insufficient data ready to transmit, or for other reasons, the base station 412 or base station 414 may indicate the victim UE 410 to refrain from measuring CLI 402 in corresponding CLI measurement resource(s) via corresponding bit value(s) for those resource(s) in a similar manner to that applied in DCI format 2_1 or 2_4 (such as using the sequence of bits 508 in FIG. 5). For example, the indicated symbols and PRBs which the victim UE is to refrain from measuring or filtering CLI 402 may be over an entire, configured CLI measurement resource or occasion (such as in the set of symbols 506 over bandwidth 504 in FIG. 5), over a subset of symbols in an entire bandwidth of the CLI measurement resource or occasion (such as in one or more symbol groups 510 over bandwidth 504 in FIG. 5), or over a subset of symbols and RBs in the CLI measurement resource or occasion (such as in one or more symbol groups 510 over one or more RB groups 512 in FIG. 5). In another example, the indicated symbols and PRBs may be in previously received and buffered resources (akin to those preempted in DCI format 2_1), or in upcoming resources (akin to those cancelled in DCI format 2_4). In a further example, the indication may be received in a DCI or a MAC-CE, where in the case of DCI, the indication may reuse the DCI format 2_1 or 2_4, or the indication may be carried in a separate DCI format. The skipped CLI measurement resources may include SRS resources, CLI-RSSI resources, or a combination of SRS and CLI-RSSI resources. As a result, the victim UE 410 may skip measuring or filtering CLI 402 in resources that do not include actual interference from the aggressor UE, thereby providing more accurate CLI measurement reports and further providing power savings at the victim UE 410 (since the UE may not consume unnecessary power measuring false CLI in these resources).

Figure 6:
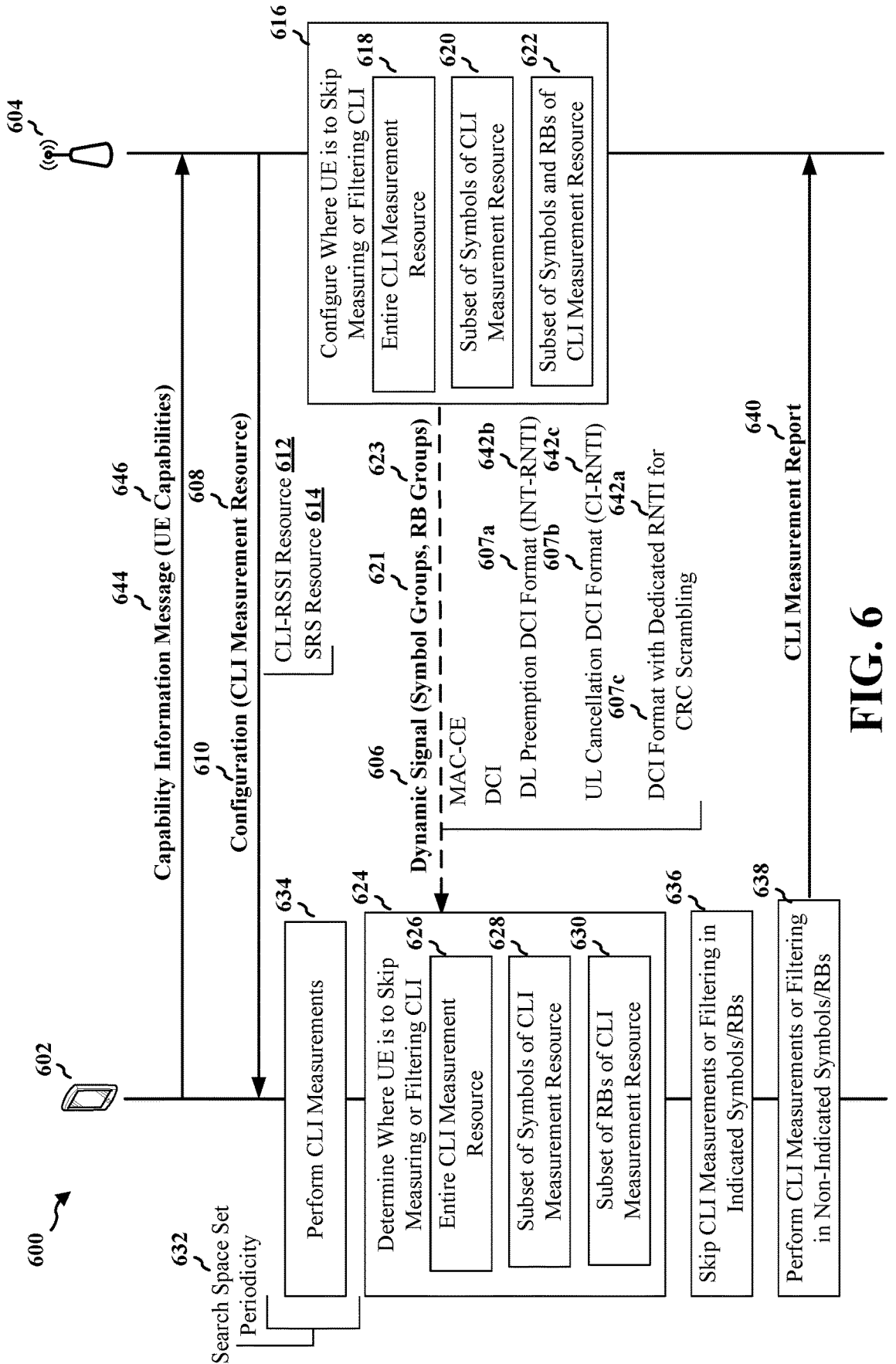
FIG. 6 illustrates an example of a call flow between a UE and a BS.

FIG. 6 illustrates an example 600 of a call flow between a UE 602 and a base station 604. UE 602 may correspond to victim UE 410 in FIG. 4, while base station 604 may correspond to base station 412 or base station 414 in FIG. 4. In one example, the base station 604 may send a dynamic signal 606 indicating the UE 602 is not to measure or filter CLI (e.g., CLI 402) in at least a portion of a CLI measurement resource 608. For example, the dynamic signal 606 or indication may be a DCI using DCI format 607a (DCI format 2_1), a DCI using DCI format 607b (DCI format 2_4), a DCI using a different DCI format 607c, a MAC-CE, or some other dynamic signal to inform the UE 602 to refrain from measuring or filtering CLI in at least a portion of CLI measurement resource 608. The CLI measurement resource 608 may be previously configured in a CLI resource configuration 610, such as an RRC configuration indicating time-frequency resources associated with a CLI-RSSI resource 612 or an SRS resource 614, and the dynamic signal 606 may indicate one or more of these time-frequency resources in which the UE is to skip measuring or filtering CLI. The indicated CLI measurement resource 608 may correspond to a resource that an aggressor UE (e.g., aggressor UE 408) determines not to use for an SRS, PUSCH, PUCCH, or other uplink transmission (e.g., uplink transmission 406). For example, the CLI measurement resource 608 may include one or more symbols and RBs overlapping with unused resource 413.

In another example, at block 616, when the base station 604 configures the dynamic signal 606 informing the UE 602 to refrain from measuring or filtering CLI in the indicated CLI measurement resource 608, the base station 604 may apply one of multiple resource granularities or network (NW) options for the UE 602 to consider when skipping a CLI measurement or filter. In a first NW option 618 having a coarse resource granularity, the base station 604 may indicate in the dynamic signal 606 for the UE 602 to refrain from measuring or filtering CLI in resources of an entire CLI measurement resource. For example, the dynamic signal 606 may include one bit which if set for example to '1', indicates the UE 602 to skip measuring or filtering CLI in the set of consecutive OFDM symbols and set of consecutive RBs comprised within the entire CLI measurement occasion. Thus, in this first NW option, the dynamic signal may indicate via a single bit whether CLI is not measured or filtered in a CLI measurement occasion.

In a second NW option 620 having a medium resource granularity, the base station 604 may indicate in the dynamic signal 606 for the UE 602 to refrain from measuring or filtering CLI in a group 621 of OFDM symbols over an entire bandwidth of the CLI measurement resource. For example, the dynamic signal may include multiple bits respectively corresponding to different groups 621 of consecutive OFDM symbols and if one or more of these bits are set for example to '1', the UE is indicated to skip measuring or filtering CLI in the entire set of consecutive RBs associated with the corresponding group(s) 621 of consecutive symbols within the CLI measurement occasion. The group(s) 621 of symbols may correspond, for example, to symbol groups 510 in FIG. 5. Thus, in this second NW option, the dynamic signal may indicate, via a single bit corresponding to a specific group of symbols over an entire bandwidth of the CLI measurement resource, whether CLI is not measured in this specific group of symbols overlapping with the CLI measurement occasion. The base station 604 may apply this second NW option, for example, in cases where the unused resource 413 corresponding to the CLI measurement occasion is an SRS resource, since SRS transmissions may not be properly measure-able over less than the entirety of the bandwidth configured for the SRS.

In a third NW option 622 having a fine granularity, the base station 604 may indicate in the dynamic signal 606 for the UE 602 to refrain from measuring or filtering CLI in a group of OFDM symbols over a group 623 of RBs in the CLI measurement resource. For example, the dynamic signal 606 may include multiple bits respectively mapped to different pairs of groups 621 of consecutive OFDM symbols and groups 623 of consecutive RBs, similar to DCI format 2_1 or 2_4, and if one or more of these bits are set for example to '1', the UE 602 is indicated to skip measuring or filtering CLI in the corresponding group(s) 623 of consecutive RBs paired with the corresponding group(s) 621 of consecutive symbols in the CLI measurement occasion. The group(s) 621 of symbols may correspond, for example, to symbol groups 510 in FIG. 5, and the group(s) 623 of RBs may correspond, for example, to RB groups 512 in FIG. 5. For instance, in the example of FIG. 5 having fourteen RB—symbol group pairs, if the CLI measurement resource was configured similarly with a plurality of RB-symbol group pairs and the dynamic signal 606 from the base station 604 indicating to skip CLI measurement was configured with the same illustrated sequence of bits 508, the UE 602 may refrain from measuring or filtering CLI in the pairs of RB groups 512 and symbol groups 510 set with a bit of '1', while continuing to measure or filter CLI in the pairs of RB groups 512 and symbol group 510 set with a bit of '0'. Thus, in the third NW option, the dynamic signal 606 may indicate, via a single bit corresponding to a specific group or subset of symbols over a specific group or subset of RBs of the CLI measurement resource, whether CLI is not measured in this specific pair of RBs and symbols overlapping with the CLI measurement occasion.

Accordingly, the third NW option 622 may follow the format of a downlink preemption DCI (DCI format 2_1) or an uplink cancellation DCI (DCI format 2_4), while indicating the UE 602 to skip or perform CLI measurements or filtering rather than apply downlink reception or uplink cancellation. Moreover, the third NW option 622 may generally encompass or support the aforementioned first NW option 618 and second NW option 620, since the base station 604 may apply this third NW option to flexibly arrive at either the first or second NW options. For example, the dynamic signal 606 may indicate the UE 602 to skip multiple subsets of RBs over the entire bandwidth corresponding to a specific group of subset of symbols to result in a same effect as the second NW option (such as by marking every bit 508 in one or more columns corresponding to respective symbol groups 510 in FIG. 5 with '1'), or the dynamic signal 606 may indicate the UE 602 to skip multiple subsets of RBs over an entire bandwidth corresponding to multiple subsets of symbols over an entire CLI measurement occasion to result in a same effect as the first NW option (such as by marking every bit 508 in every column in FIG. 5 with '1').

In a further example related to the third NW option 622, at block 624, the UE 602 may determine to skip measuring or filtering CLI in at least a portion of the CLI measurement occasion in response to the dynamic signal 606. The behavior of the UE 602 determined at block 624 may not necessarily follow, but can follow, the pairs of RB groups 623 and symbol groups 621 indicated in the dynamic signal 606 which the base station 604 indicates the UE 602 to skip for CLI measurement or filtering. For example, even if the base station 604 dynamically indicates the UE 602 to not measure CLI in one or multiple symbols and one or multiple RBs contained within the CLI measurement occasion when applying the third NW option 622 at block 616, the UE 602 may still measure or filter CLI in the indicated RBs, the UE may skip measuring or filtering CLI in more than just the indicated symbols and RBs, or the UE may perform some other behavior or one of multiple UE options at block 624.

For example, in a first UE option 626, the UE 602 may skip measuring or filtering CLI in the entire CLI measurement resource 608 or occasion, such as in every symbol over the entire bandwidth of the configured CLI measurement occasion, notwithstanding whether the dynamic signal 606 indicates the UE 602 to skip merely a subset of these symbols and RBs corresponding to symbol groups 621 and RB groups 623. Thus, if the dynamic signal 606 indicates the UE 602 to skip measuring or filtering CLI in at least one group of symbols and RBs overlapping with the CLI measurement occasion, the UE 602 may skip measuring or filtering the entire CLI measurement occasion. The UE 602 may determine to apply this behavior at block 624 if, for example, the UE 602 is a reduced capability UE or other UE that intends to perform low complexity operations, or in the case where the indicated RB-symbol group pair corresponds to an unused resource of an aggressor UE which was configured or scheduled for an SRS. For instance, an aggressor UE may not transmit SRS in less than the entire bandwidth of the resource, and thus a partial bandwidth, SRS RSRP measurement by the UE 602 may be insensible. Although applying the first UE option 626 may have the same result as applying the first NW option 618, namely causing the UE to skip measurement in the entire CLI measurement occasion, the first UE option 626 depends on the third NW option 622 which is a more flexible approach than the first NW option 618.

In a second UE option 628, the UE 602 may skip measuring or filtering CLI in the entire bandwidth of the indicated group 621 of symbols within the CLI measurement resource 608 or occasion, notwithstanding whether the dynamic signal 606 indicates the UE 602 to skip merely a subset of these RBs corresponding to RB groups 623. Thus, if the dynamic signal 606 indicates the UE 602 to skip measuring or filtering CLI in at least one group of symbols and RBs overlapping with the CLI measurement occasion, the UE 602 may follow the indication with respect to the symbols corresponding to symbol groups 621, but not with respect to the RBs corresponding to RB groups 623. Instead, the UE 602 may skip measuring or filtering the full set of RBs associated with the indicated group(s) of symbols in the CLI measurement resource. This is in contrast to the first UE option 626, where the UE 602 may not follow the indication with respect to either symbols and RBs and instead refrains from measuring the entire CLI measurement resource. In that first option, the UE 602 may determine at block 624 not to measure or filter CLI overlapping with any symbol or RB in the CLI measurement occasion, but in this second option, the UE 602 may determine at block 624 to still measure or filter CLI overlapping with non-indicated symbols over the entire bandwidth of the CLI measurement occasion. Similar to the first UE option 626, the UE 602 may determine to apply this behavior or second UE option 628 if, for example, the indicated RB-symbol group pair corresponds to an unused resource of an aggressor UE which was configured or scheduled for an SRS (since again a partial bandwidth, SRS RSRP measurement may be insensible). Alternatively, the UE 602 may determine to apply the second UE option 628 if the CLI measurement resource 608 is a CLI RSSI resource, if for example the UE 602 intends to perform CLI measurements of CLI RSSI in the time domain but not in the frequency domain.

In a third UE option 630, the UE 602 may skip measuring or filtering CLI in the indicated group 623 of RBs in the full set of symbols within the CLI measurement resource 608 or occasion, notwithstanding whether the dynamic signal 606 indicates the UE 602 to skip merely a subset of these symbols corresponding to symbol groups 621. Thus, if the dynamic signal 606 indicates the UE 602 to skip measuring or filtering CLI in at least one group of symbols and RBs overlapping with the CLI measurement occasion, the UE 602 may follow the indication with respect to the RBs corresponding to RB groups 623 but not with respect to the symbols corresponding to symbol groups 621, and accordingly skip measuring or filtering the indicated group(s) 623 of RBs in the full set of symbols in the CLI measurement resource 608. For instance, in the example of FIG. 5 having fourteen RB-symbol group pairs, if the CLI measurement resource 608 was configured similarly with RB-symbol group pairs and the dynamic signal 606 from the base station 604 indicating to skip CLI measurement was configured with the same illustrated sequence of bits 508, the UE 602 may determine to refrain from measuring or filtering CLI in RB groups 512 associated with symbol groups 510 with a bit of '1' in the full, set of symbols 506 in the CLI measurement resource 608, while continuing to measure or filter CLI in the RB groups 512 specifically associated with symbol groups with a bit of '0'. The UE 602 may determine to apply this behavior if, for example, the indicated RB-symbol group pair corresponds to an unused resource of an aggressor UE which was configured or scheduled for a PUSCH transmission with a reduced bandwidth. Alternatively, similar to the second UE option 628, the UE 602 may determine to apply this behavior if the CLI measurement resource 608 is a CLI RSSI resource. In such case, when the UE 602 performs a CLI RSSI measurement in the indicated RB and symbol group pairs, the UE may directly filter this instantaneous measurement after scaling or otherwise reducing the strength of the measured CLI RSSI to a nominal RSSI equivalent to that which would be measured over an arbitrary quantity of RBs (such as 6 RBs) associated with a given subcarrier spacing (such as 15 kHz). However, unlike the first UE option 626 and the second UE option 628, here the UE 602 may determine not to apply the behavior of the third UE option 630 if the CLI measurement resource 608 is a SRS resource, since the orthogonality of an SRS sequence may be lost if SRS RSRP is measured over a partial bandwidth of the CLI measurement occasion. In contrast, loss of orthogonality may not be present in, or otherwise a concern for, CLI RSSI.

In a further example, the dynamic signal 606 may indicate the UE 602 to refrain from measuring or filtering CLI in resources occurring prior to reception of the dynamic signal 606, such as within PRBs and OFDM symbols similar to those preempted using a DCI format 2_1, or in resources occurring after reception of the dynamic signal 606, such as within PRBs and OFDM symbols similar to those cancelled using a DCI format 2_4. For example, in the former case where the indicated resources occur prior to dynamic signal 606, the dynamic signal 606 may indicate whether the UE 602 is to skip CLI filtering in indicated PRBs and OFDM symbols in a last PDCCH monitoring period, or within a duration of periodicity 632 of a search space set for the DCI. In this example, since the CLI measurement resource 608 thus occurs prior in time to reception of the dynamic signal 606, the UE 602 may initially perform instantaneous CLI measurements at block 634 in at least a portion of the CLI measurement occasion, and store these intermediate results temporarily in memory such as memory 360 prior to performing layer 3 filtering. Once the UE 602 receives the dynamic signal 606 indicating the RB groups 623 and symbol groups 621 in which the UE 602 is to refrain from measuring or filtering CLI according to any one of the foregoing NW options 618, 620, 622, or after the UE 602 determines the RB groups 623 and symbol groups 621 in which the UE is to refrain from measuring or filtering CLI according to any one of the foregoing UE options 626, 628, 630, the UE 602 may filter its CLI measurements according to the dynamic signal 606. For example, the UE 602 may discard its instantaneous CLI measurements corresponding to RB-symbol group pairs indicated in the dynamic signal (and thus skip filtering these measurements) at block 636, and the UE may perform layer 3 filtering on the other instantaneous CLI measurements corresponding to the remaining symbols and RBs excluded from the dynamic signal indication at block 638.

On the other hand, in the latter case where the indicated resources occur after reception of dynamic signal 606, the dynamic signal 606 may indicate whether the UE 602 is to skip CLI measurements or filtering in indicated PRBs and OFDM symbols subsequently occurring in time with reference to an end of a PDCCH reception where the UE 602 detects the dynamic signal. In this example, the CLI measurement resource 608 would occur subsequent in time to the dynamic signal 606, and therefore the UE 602 may refrain from performing CLI measurements as well as layer 3 filtering in the indicated symbols and RBs in the dynamic signal accordingly at block 636 while continuing to perform CLI measurements as well as layer 3 filtering in the non-indicated symbols and RBs accordingly at block 638. In either the former or latter case, after the UE skips CLI measurements or filtering at block 636 in accordance with any one of the foregoing NW options 618, 620, 622 or UE options 626, 628, 630, and after the UE performs CLI measurements or filtering at block 638 for the remaining symbols and RBs of CLI measurement resource 608, the UE 602 may send CLI measurement report 640 to base station 604 (either periodically or in response to an event trigger such as previously described).

In another example, the dynamic signal 606 may follow a same format as a DCI used for downlink preemption or uplink cancellation, such as described with respect to the third NW option 622 above, but here the dynamic signal 606 may be differentiated from the DCI format 2_1 and from the DCI format 2_4 via different RNTIs. For example, a RNTI 642a associated with the dynamic signal 606 indicating to the UE 602 whether to skip CLI measuring or filtering may be different than an INT-RNTI 642b associated with downlink preemption and a CI-RNTI 642c associated with uplink cancellation. In this way, the UE 602 may be able to ascertain whether a received DCI is for downlink preemption (the DCI format 607a or DCI format 2_1), for uplink cancellation (the DCI format 607b or DCI format 2_4), or for CLI measuring or filtering (the DCI format 607c or a different DCI format than DCI format 2_1 and 2_4), based on the different RNTIs used to scramble the CRC appended to the DCI. The UE 602 may then be able to blindly attempt to descramble the CRC of a received DCI using the various RNTIs, and if a descrambled CRC using the dedicated RNTI 642a matches an expected CRC, the UE 602 may determine that the received DCI indicates the UE 602 to skip measuring or filtering in CLI in the indicated resources within dynamic signal 606. This separation of RNTIs between downlink preemption and uplink cancellation DCIs from CLI measurement-related DCIs may also provide backwards compatibility for UEs that are not capable of processing such CLI measurement-related DCIs.

Moreover, the different RNTI 642a associated with CLI measuring or filtering may be a UE-specific RNTI. For instance, DCI format 2_1 and DCI format 2_4 are group common DCI formats that apply in common to multiple UEs, since downlink preemption and uplink cancellation may affect groups of UEs at a time. Thus, the RNTIs associated with downlink preemption and uplink cancellation, namely INT-RNTI 642b and CI-RNTI 642c respectively, are group-common RNTIs. However, since the CLI impacting a victim UE may be UE-specific, a UE-specific RNTI may correspondingly be defined for the dynamic signal 606. Alternatively, a different group-common RNTI may be defined for the dynamic signal in other examples.

In an additional example, the base station 604 may provide the dynamic signal 606 to the UE 602, and the UE 602 may process the dynamic signal 606 accordingly, if the UE 602 is capable of supporting the skipping of CLI measurements or filtering in indicated resources of the dynamic signal 606. For instance, the UE 602 may provide a capability information message 644 to the base station 604 indicating one or more UE capabilities 646 such as whether the UE 602 is capable of supporting reception and processing of the dynamic signal 606, whether the UE 602 is capable of supporting one or more of the foregoing NW options 618, 620, 622, whether the UE 602 is capable of supporting one or more of the foregoing UE options 626, 628, 630, whether the UE 602 is capable of supporting decoding of the dynamic signal 606 using the dedicated RNTI 642a for CLI measurement or filtering, or whether the UE 602 is capable of supporting one or more of the various aspects or combinations of aspects pertaining to the dynamic signal 606 that have been referenced throughout this disclosure. The UE 602 may similarly indicate to the base station 604 in the capability information message 644 whether the UE 602 is capable of processing, or intends to apply, the dynamic signal 606 configured according to one or more of the NW options 618, 620, 622, and whether the UE 602 is capable of processing, or intends to apply, one or more of the UE options 626, 628, 630 in response to the dynamic signal 606. Thus, the base station 604 may determine from the capability information message 644 whether the base station 604 may successfully transmit such dynamic signal 606 to the UE 602, and what behavior the base station 604 is to expect from the UE 602 in response to such dynamic signal 606.

FIG. 7 is a flowchart 700 of an example method or process for wireless communication performable at a first UE which measures and filters CLI from a second UE and which supports preemption of CLI measurement and filtering in a CLI measurement resource. The method may be performed by a UE, such as the UE 104, 350, 602, the victim UE 410, the apparatus 902, or its components as described herein. Optional aspects are illustrated in dashed lines.

In some examples, in block 702, the first UE transmits a capability information message indicating one or more UE capabilities to support refraining from measuring or filtering CLI in at least a portion of a CLI measurement resource. For example, block 702 may be performed by capability information message component 940. For instance, referring to the Figures, UE 602 may transmit capability information message 644 indicting one or more UE capabilities 646 to support skipping of measurements or filtering of CLI 402 at block 636 in one or more symbol groups 621 and one or more RB groups 623 of CLI measurement resource 608 according to one or more of NW options 618, 620, 622 or UE options 626, 628, 630.

In some examples, in block 704, the first UE receives a configuration indicating a cross link interference (CLI) measurement resource. For example, block 704 may be performed by configuration component 942. For instance, referring to the Figures, UE 602 may receive configuration 610, such as a CLI measurement configuration via RRC signaling, indicating CLI measurement resource 608. For example, the configuration 610 may include time-frequency resources or other parameters of CLI measurement resource 608. In some examples, the CLI measurement resource includes a CLI-RSSI resource or an SRS resource.

In some examples, in block 706, the first UE receives an indication whether to measure or filter CLI associated with a second UE in the CLI measurement resource. For example, block 706 may be performed by indication component 944. For instance, referring to the Figures, the UE 602 (victim UE 410) may receive dynamic signal 606 indicating whether the UE 602 is to skip measurements or filtering of CLI from another UE (such as aggressor UE 408) at block 636 in one or more symbol groups 621 and one or more RB groups 623 of CLI measurement resource 608 according to one or more of NW options 618, 620, 622 or UE options 626, 628, 630. In some examples, the indication is received in DCI or a MAC-CE.

In some examples, in block 708, the first UE refrains from measuring or filtering the CLI in at least a portion of the CLI measurement resource in response to the indication. For example, block 708 may be performed by CLI measurement component 946. For instance, referring to the Figures, the UE 602 at block 636 may skip measuring or filtering CLI 402 in one or more symbol groups 621 and one or more RB groups 623 of CLI measurement resource 608, which time-frequency resources are configured in dynamic signal 606 to be skipped at block 616 according to one or more of NW options 618, 620, 622, or which time-frequency resources are determined to be skipped at block 636 according to one or more of UE options 626, 628, 630.

In some examples, the at least the portion of the CLI measurement resource corresponds to an unused resource of the second UE at least for a PUSCH transmission, a PUCCH transmission, or an SRS transmission of the second UE. For instance, referring to the Figures, the indicated symbol group(s) 621 and RB group(s) 623 in the dynamic signal 606 for CLI measurement resource 608 may correspond to unused resource 413 of aggressor UE 408 for a PUSCH, PUCCH, SRS, or other uplink transmission 406.

In some examples, the indication is of whether to measure or filter the CLI in an entirety of the CLI measurement resource. For instance, referring to the Figures, the dynamic signal 606 may be configured according to first NW option 618, and the UE 602 at block 636 skips measuring or filtering CLI 402 in the set of symbols 506 and bandwidth 504 of RBs within the entirety of the CLI measurement resource 608.

In some examples, the indication is of whether to measure or filter the CLI in one or more groups of symbols of the CLI measurement resource over an entire bandwidth of the CLI measurement resource, and the indication identifies the one or more groups of symbols. For instance, referring to the Figures, the dynamic signal 606 may be configured according to second NW option 620, such that the dynamic signal 606 indicates symbol group(s) 510, 621 of CLI measurement resource 608, and the UE 602 at block 636 skips measuring or filtering CLI 402 in the indicated symbol groups 621 over the bandwidth 504 of RBs within the CLI measurement resource 608.

In some examples, the indication is of whether to measure or filter the CLI in one or more groups of symbols of the CLI measurement resource over one or more groups of RBs in the CLI measurement resource, and the indication identifies the one or more groups of symbols and the one or more groups of RBs. For instance, referring to the Figures, the dynamic signal 606 may be configured according to third NW option 622, such that the dynamic signal 606 indicates symbol group(s) 510, 621 and RB group(s) 512, 623 of CLI measurement resource 608, and the UE 602 at block 636 skips measuring or filtering CLI 402 in the indicated pairs of symbol groups 621 and RB groups 623 within the CLI measurement resource 608.

In some examples, the indication is received in DCI including a DCI format associated with downlink preemption. For instance, referring to the Figures, the dynamic signal 606 may be or carry a DCI having DCI format 607a specific to downlink preemption, such as DCI format 2_1. In some examples, the indication is received in DCI including a DCI format associated with uplink cancellation. For instance, referring to the Figures, the dynamic signal 606 may be or carry a DCI having DCI format 607*b* specific to uplink cancellation, such as DCI format 2_4.

In some examples, when in block 708 the UE refrains from measuring or filtering the CLI in the at least the portion of the CLI measurement resource, the UE refrains from measuring or filtering the CLI in an entirety of the CLI measurement resource. For instance, referring to the Figures, even though the dynamic signal 606 may be configured according to third NW option 622, such that the dynamic signal 606 indicates symbol group(s) 510, 621 and RB group(s) 512, 623 of CLI measurement resource 608, the UE may operate at block 636 according to the first UE option 626 to skip measuring or filtering CLI 402 in the set of symbols 506 and bandwidth 504 of RBs within the entirety of the CLI measurement resource 608.

In some examples, when in block 708 the UE refrains from measuring or filtering the CLI in the at least the portion of the CLI measurement resource, the UE refrains from measuring or filtering the CLI in one or more groups of symbols of the CLI measurement resource over an entire bandwidth of the CLI measurement resource, the indication identifying the one or more groups of symbols. For instance, referring to the Figures, even though the dynamic signal 606 may be configured according to third NW option 622, such that the dynamic signal 606 indicates symbol group(s) 510, 621 and RB group(s) 512, 623 of CLI measurement resource 608, the UE may operate at block 636 according to the second UE option 628 to skip measuring or filtering CLI 402 in the indicated symbol groups 621 over the bandwidth 504 of RBs within the CLI measurement resource 608.

In some examples, when in block 708 the UE refrains from measuring or filtering the CLI in the at least the portion of the CLI measurement resource, the UE refrains from measuring or filtering the CLI in a set of symbols of the CLI measurement resource over one or more groups of RBs in the CLI measurement resource, the indication identifying the one or more groups of RBs. For instance, referring to the Figures, even though the dynamic signal 606 may be configured according to third NW option 622, such that the dynamic signal 606 indicates symbol group(s) 510, 621 and RB group(s) 512, 623 of CLI measurement resource 608, the UE may operate at block 636 according to the third UE option 630 to skip measuring or filtering CLI 402 in the indicated RB groups 623 over the full, set of symbols 506 within the CLI measurement resource 608.

In some examples, the indication identifies whether to refrain from measuring or filtering the CLI in the at least the portion of the CLI measurement resource occurring prior to reception of the indication. In some examples, the indication is received in DCI including a DCI format associated with downlink preemption, and the CLI measurement resource includes a duration of time equal to a periodicity of a search space set associated with the DCI. For instance, referring to FIG. 6, the dynamic signal 606 may be or carry a DCI having DCI format 607*a* associated with downlink preemption (such as DCI format 2_1), and the DCI may indicate the UE 602 to skip CLI filtering in the indicated symbol group(s) 621 and RB group(s) 623 of CLI measurement resource 608 in a last PDCCH monitoring period, or within the duration of periodicity 632 of a search space set for the DCI. The last PDCCH monitoring period or periodicity 632 of the search space set may occur in time prior to reception of the dynamic signal 606.

In some examples, the indication identifies whether to refrain from measuring or filtering the CLI in the at least the portion of the CLI measurement resource occurring after reception of the indication. For instance, referring to FIG. 6, the dynamic signal 606 may be or carry a DCI having DCI format 607*b* associated with uplink cancellation (such as DCI format 2_4), and the DCI may indicate the UE 602 to skip CLI filtering in the indicated symbol group(s) 621 and RB group(s) 623 of CLI measurement resource 608 that occur subsequent in time to reception of the dynamic signal 606.

In some examples, the indication is received in a message having a CRC scrambled by a RNTI associated with CLI measurement. In some examples, the message includes DCI including a DCI format associated with downlink preemption or uplink cancellation, and the RNTI is different than an INT-RNTI or a CI-RNTI. For instance, referring to FIG. 6, the dynamic signal 606 may be or carry a DCI having DCI format 607*c* which is associated with a CRC scrambled by different RNTI 642*a* than INT-RNTI 642*b* and CI-RNTI 642*c*. This different RNTI 642*a* may be dedicated or configured specifically for CLI measurement or filtering.

Figure 8:
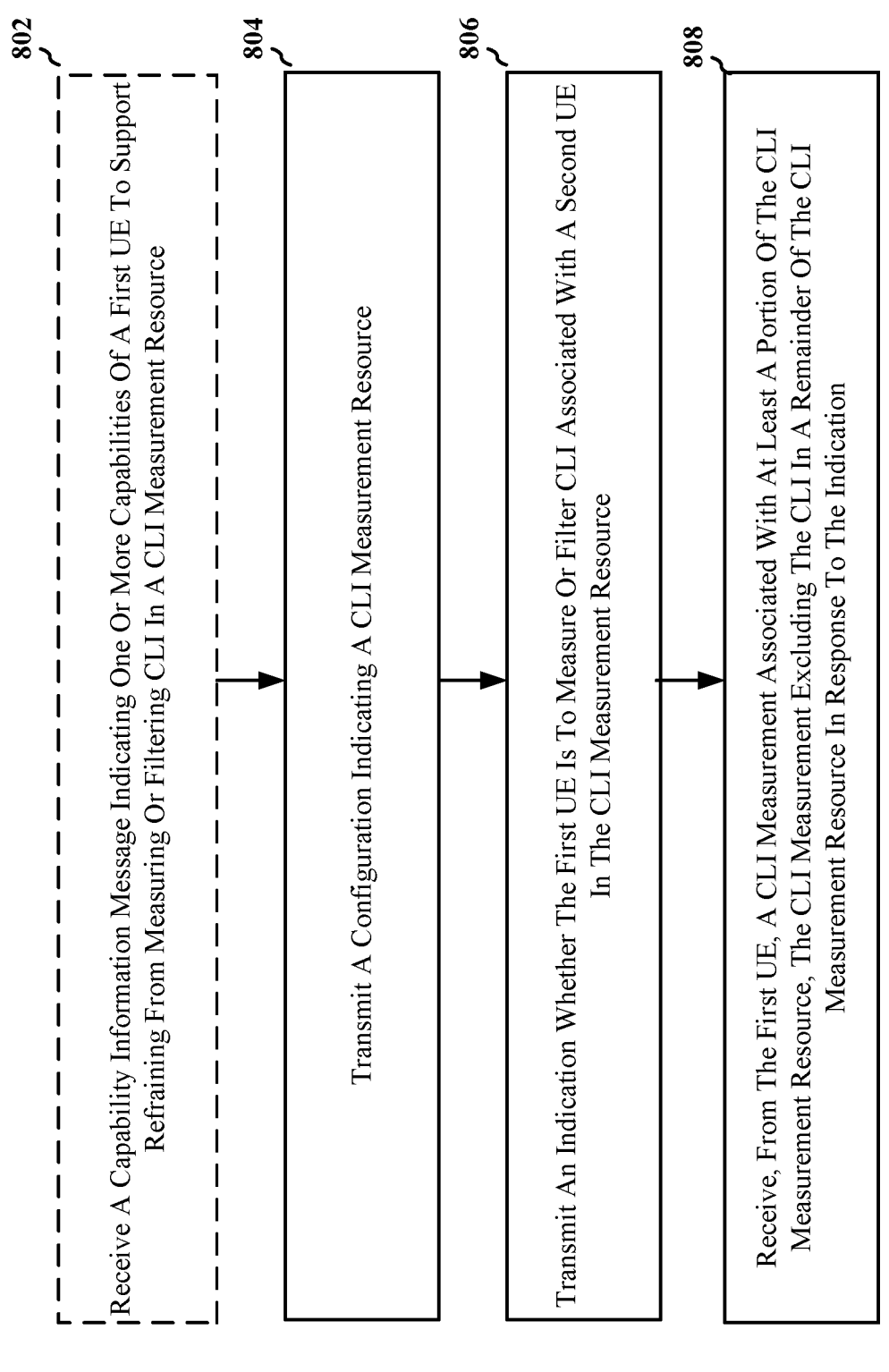
FIG. 8 is a flowchart of a method of wireless communication at a network entity such as a base station.

FIG. 8 is a flowchart 800 of an example method or process for wireless communication performable at a network entity which configures a first UE to measure and filter CLI from a second UE and which supports preemption of CLI measurement and filtering in a CLI measurement resource. The method may be performed by a network entity, such as the base station 102/180, 181, 310, 412, 414, 604, the apparatus 1002, or its components as described herein. Optional aspects are illustrated in dashed lines.

In some examples, at block 802, the network entity receives a capability information message indicating one or more capabilities of the first UE to support refraining from measuring or filtering CLI in a CLI measurement resource. For example, block 802 may be performed by capability information message component 1040. For instance, referring to the Figures, base station 604 may receive capability information message 644 indicting one or more UE capabilities 646 to support UE skipping of measurements or filtering of CLI 402 at block 636 in one or more symbol groups 621 and one or more RB groups 623 of CLI measurement resource 608 according to one or more of NW options 618, 620, 622 or UE options 626, 628, 630.

In some examples, in block 804, the network entity transmits a configuration indicating the CLI measurement resource. For example, block 804 may be performed by configuration component 1042. For instance, referring to the Figures, base station 604 may transmit configuration 610, such as a CLI measurement configuration via RRC signaling, indicating CLI measurement resource 608. For example, the configuration 610 may include time-frequency resources or other parameters of CLI measurement resource 608. In some examples, the CLI measurement resource includes a CLI-RSSI resource or an SRS resource.

In some examples, at block 806, the network entity transmits an indication whether a first UE is to measure or filter CLI associated with a second UE in the CLI measurement resource. For example, block 806 may be performed by indication component 1044. For instance, referring to the Figures, the base station 604 may transmit dynamic signal 606 indicating whether the UE 602 (the victim UE 410) is to skip measurements or filtering of CLI from another UE (such as aggressor UE 408) at block 636 in one or more symbol groups 621 and one or more RB groups 623 of CLI measurement resource 608 according to one or more of NW options 618, 620, 622 or UE options 626, 628, 630. In some examples, the indication is transmitted in DCI or a MAC-CE.

In some examples, in block 808, the network entity receives, from the first UE, a CLI measurement associated with at least a portion of the CLI measurement resource, the CLI measurement excluding the CLI in a remainder of the CLI measurement resource in response to the indication. For example, block 808 may be performed by CLI measurement component 1046. For instance, referring to the Figures, the base station 604 may receive CLI measurement report 640 from UE 602 including CLI 402 which the UE 602 measured and filtered at block 638 in symbols and RBs of CLI measurement resource 608 that were not indicated in the symbol group(s) 621 and RB group(s) 623 referenced in dynamic signal 606. As for the remainder of symbols and RBs in CLI measurement resource 608 which were indicated in the symbol group(s) 621 and RB group(s) 623 of dynamic signal 606, these time-frequency resources are excluded from the CLI measurement report 640 since the UE 602 skipped measuring or filtering these resources at block 636 in response to the dynamic signal 606.

In some examples, the remainder of the CLI measurement resource corresponds to an unused resource of the second UE at least for a PUSCH transmission, a PUCCH transmission, or an SRS transmission of the second UE. For instance, referring to the Figures, the indicated symbol group(s) 621 and RB group(s) 623 in the dynamic signal 606 for CLI measurement resource 608 may correspond to unused resource 413 of aggressor UE 408 for a PUSCH, PUCCH, SRS, or other uplink transmission 406.

In some examples, the indication is of whether to measure or filter the CLI in one or more groups of symbols of the CLI measurement resource over one or more groups of RBs in the CLI measurement resource, and the indication identifies the one or more groups of symbols and the one or more groups of RBs. For instance, referring to the Figures, the dynamic signal 606 may be configured according to third NW option 622, such that the dynamic signal 606 indicates symbol group(s) 510, 621 and RB group(s) 512, 623 of CLI measurement resource 608, and the CLI measurement report 640 excludes these resources since the UE 602 at block 636 skips measuring or filtering CLI 402 in the indicated pairs of symbol groups 621 and RB groups 623 within the CLI measurement resource 608.

In some examples, when in block 808 the network entity receives the CLI measurement from the first UE associated with the at least the portion of the CLI measurement resource, the network entity receives a measurement including the CLI associated with one or more groups of symbols of the CLI measurement resource over an entire bandwidth of the CLI measurement resource, the indication identifying one or more other groups of symbols for the first UE to exclude in the CLI measurement. For instance, referring to the Figures, even though the dynamic signal 606 may be configured according to third NW option 622, such that the dynamic signal 606 indicates symbol group(s) 510, 621 and RB group(s) 512, 623 of CLI measurement resource 608, the UE may operate at block 636 according to the second UE option 628 to skip measuring or filtering CLI 402 in the indicated symbol groups 621 over the bandwidth 504 of RBs within the CLI measurement resource 608. As a result, the CLI measurement report 640 may exclude CLI measurements or filtered CLI over the bandwidth 504 of RBs in these skipped symbol groups, while including measured or filtered CLI in the non-indicated RBs and symbols.

In some examples, when in block 808 the network entity receives the CLI measurement from the first UE in the at least the portion of the CLI measurement resource, the network entity receives a measurement including the CLI associated with one or more groups of symbols of the CLI measurement resource over one or more groups of RBs in the CLI measurement resource, the indication identifying one or more other groups of symbols and one or more other groups of RBs for the first UE to exclude in the CLI measurement. For instance, referring to the Figures, even though the dynamic signal 606 may be configured according to third NW option 622, such that the dynamic signal 606 indicates symbol group(s) 510, 621 and RB group(s) 512, 623 of CLI measurement resource 608, the UE may operate at block 636 according to the third UE option 630 to skip measuring or filtering CLI 402 in the indicated RB groups 623 within the full, set of symbols 506 in the CLI measurement resource 608. As a result, the CLI measurement report 640 may exclude CLI measurements or filtered CLI over the skipped RB groups in the full set of symbols, while including measured or filtered CLI in the non-indicated RBs and symbols.

Figure 9:
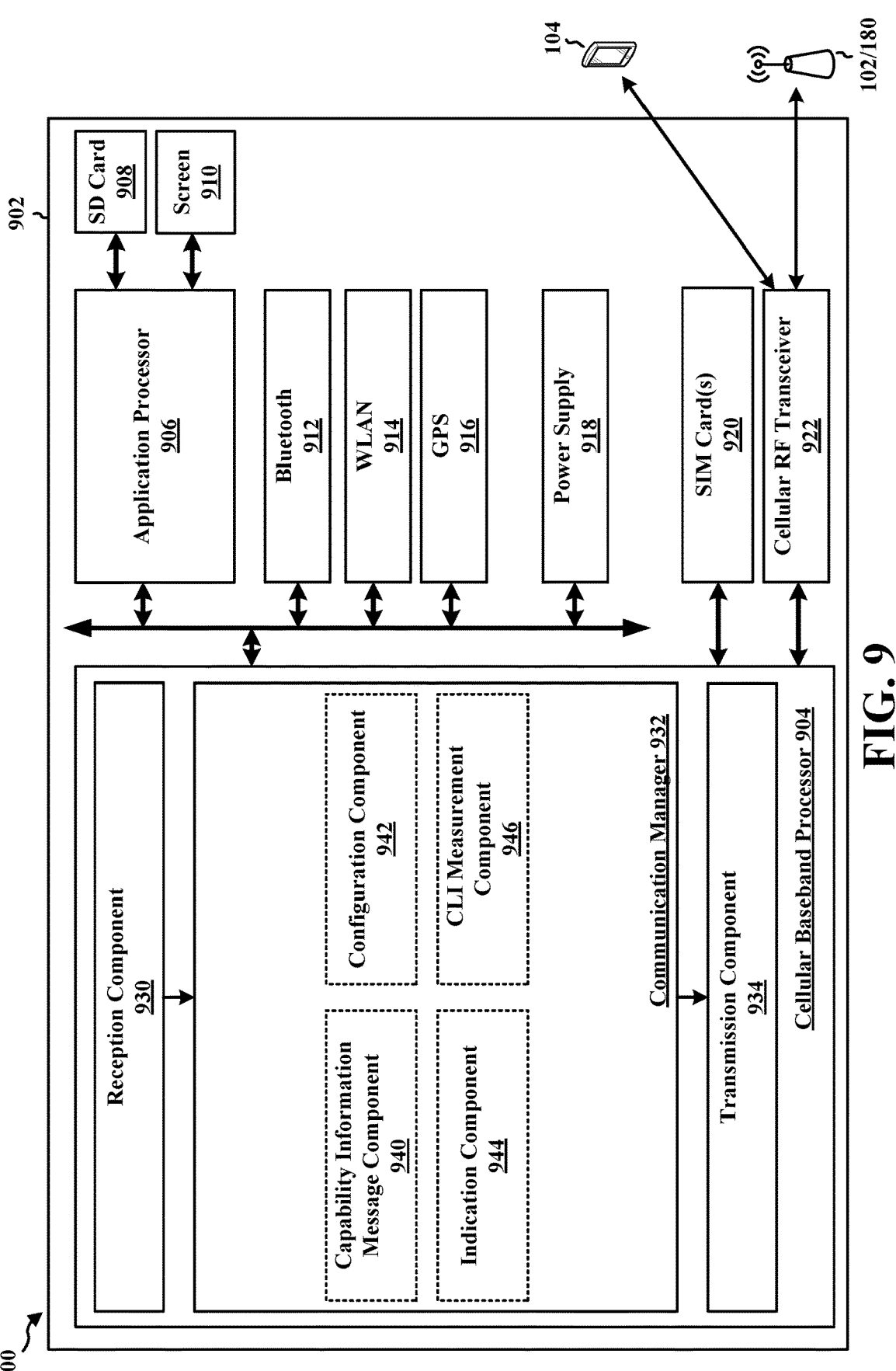
FIG. 9 is a diagram illustrating an example of a hardware implementation for a UE apparatus.

FIG. 9 is a diagram 900 illustrating an example of a hardware implementation for an apparatus 902 that supports preemption of CLI measurement and filtering in a CLI measurement resource according to some aspects of the present disclosure. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a capability information message component 940 that is configured to transmit a capability information message indicating one or more UE capabilities to support refraining from measuring or filtering CLI in at least a portion of a CLI measurement resource, such as described in connection with block 702 of FIG. 7. The communication manager 932 further includes a configuration component 942 that is configured to receive a configuration indicating a CLI measurement resource, such as described in connection with block 704 of FIG. 7. The communication manager 932 further includes an indication component 944 that is configured to receive an indication whether to measure or filter CLI associated with a second UE in the CLI measurement resource, such as described in connection with block 706 of FIG. 7. The communication manager 932 further includes a CLI measurement component 946 that is configured to refrain from measuring or filtering the CLI in at least the portion of the CLI measurement resource in response to the indication, such as described in connection with block 708 of FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving a configuration indicating a CLI measurement resource; means for receiving an indication whether to measure or filter CLI associated with a second UE in the CLI measurement resource; and means for refraining from measuring or filtering the CLI in at least a portion of the CLI measurement resource in response to the indication.

In one configuration, the apparatus 902, and in particular the cellular baseband processor 904, may include means for transmitting a capability information message indicating one or more UE capabilities to support refraining from measuring or filtering the CLI in the at least the portion of the CLI measurement resource.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
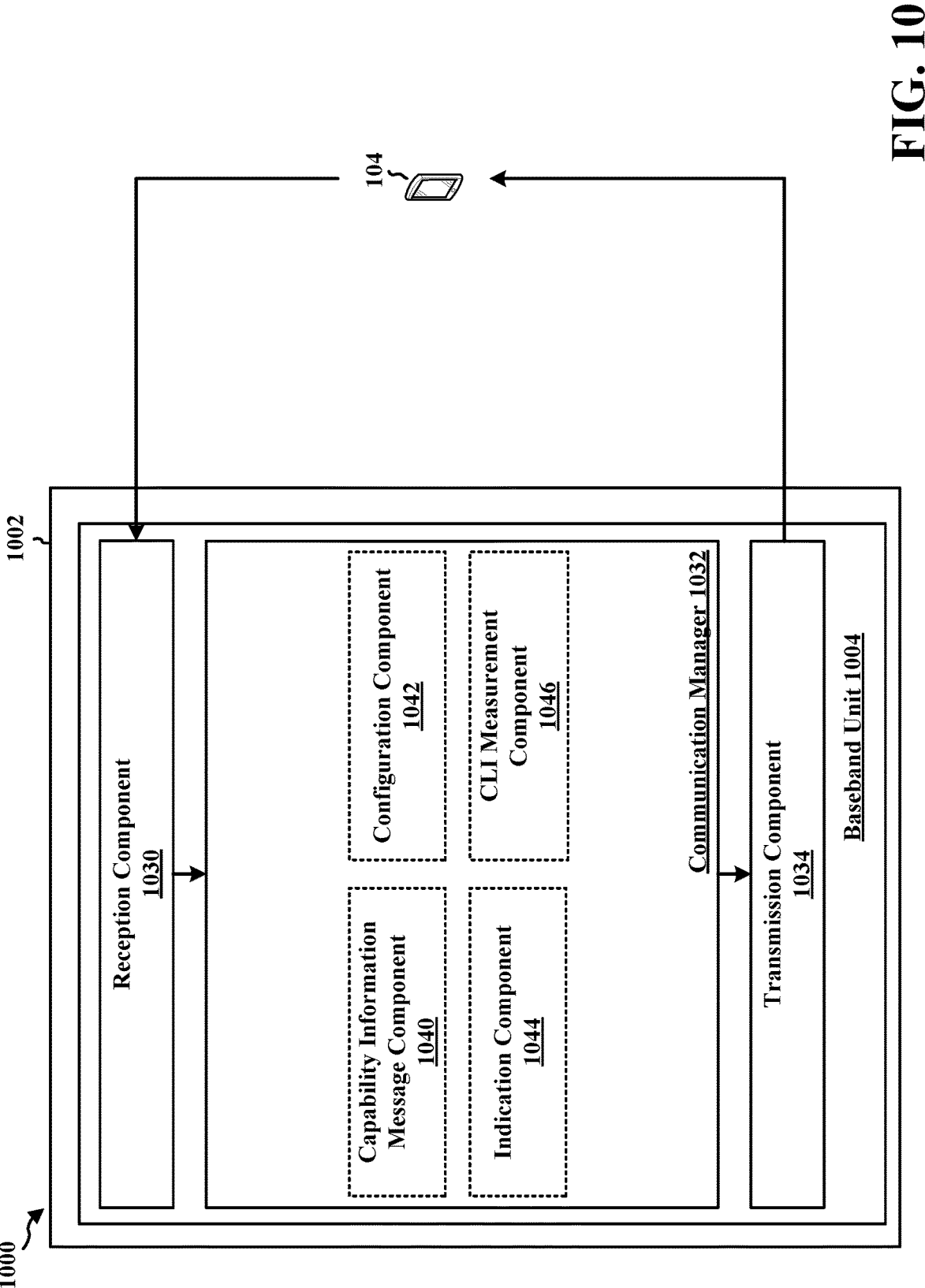
FIG. 10 is a diagram illustrating an example of a hardware implementation for a BS apparatus.

FIG. 10 is a diagram 1000 illustrating an example of a hardware implementation for an apparatus 1002 that supports preemption of CLI measurement and filtering in a CLI measurement resource according to some aspects of the present disclosure. The apparatus 1002 is a base station (BS) and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a capability information message component 1040 that is configured to receive a capability information message indicating one or more capabilities of a first UE to support refraining from measuring or filtering CLI in a CLI measurement resource, such as described with respect to block 802 of FIG. 8. The communication manager 1032 further includes a configuration component 1042 that is configured to transmit a configuration indicating a CLI measurement resource, such as described with respect to block 804 of FIG. 8. The communication manager 1032 further includes an indication component 1044 that is configured to transmit an indication whether the first UE is to measure or filter CLI associated with a second UE in the CLI measurement resource, such as described with respect to block 806 of FIG. 8. The communication manager 1032 further includes a CLI measurement component 1046 that is configured to receive, from the first UE, a CLI measurement associated with at least a portion of the CLI measurement resource, the CLI measurement excluding the CLI in a remainder of the CLI measurement resource in response to the indication, such as described with respect to block 808 of FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting a configuration indicating a cross link interference (CLI) measurement resource; means for transmitting an indication whether a first UE is to measure or filter CLI associated with a second UE in the CLI measurement resource; and means for receiving, from the first UE, a CLI measurement associated with at least a portion of the CLI measurement resource, the CLI measurement excluding the CLI in a remainder of the CLI measurement resource in response to the indication.

In one configuration, the apparatus 1002, and in particular the baseband unit 1004, may include means for receiving a capability information message indicating one or more capabilities of the first UE to support refraining from measuring or filtering the CLI in the CLI measurement resource.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. A method for wireless communication performable at a first UE, comprising: receiving a configuration indicating a cross link interference (CLI) measurement resource; receiving an indication whether to measure or filter CLI associated with a second UE in the CLI measurement resource; and refraining from measuring or filtering the CLI in at least a portion of the CLI measurement resource in response to the indication.

Clause 2. The method of clause 1, wherein the at least the portion of the CLI measurement resource corresponds to an unused resource of the second UE at least for a physical uplink shared channel (PUSCH) transmission, a physical uplink control channel (PUCCH) transmission, or a sounding reference signal (SRS) transmission of the second UE.

Clause 3. The method of clause 1 or clause 2, wherein the CLI measurement resource includes a CLI received signal strength indicator (CLI-RSSI) resource or a sounding reference signal (SRS) resource.

Clause 4. The method of any of clauses 1 to 3, wherein the indication is received in downlink control information (DCI) or a medium access control (MAC) control element (MAC-CE).

Clause 5. The method of any of clauses 1 to 4, wherein the indication is of whether to measure or filter the CLI in an entirety of the CLI measurement resource.

Clause 6. The method of any of clauses 1 to 5, wherein the indication is of whether to measure or filter the CLI in one or more groups of symbols of the CLI measurement resource over an entire bandwidth of the CLI measurement resource, and the indication identifies the one or more groups of symbols.

Clause 7. The method of any of clauses 1 to 6, wherein the indication is of whether to measure or filter the CLI in one or more groups of symbols of the CLI measurement resource over one or more groups of resource blocks (RBs) in the CLI measurement resource, and the indication identifies the one or more groups of symbols and the one or more groups of RBs.

Clause 8. The method of clause 7, wherein the indication is received in downlink control information (DCI) including a DCI format associated with downlink preemption.

Clause 9. The method of clause 7, wherein the indication is received in downlink control information (DCI) including a DCI format associated with uplink cancellation.

Clause 10. The method of any of clauses 1 to 9, wherein the refraining from measuring or filtering the CLI in the at least the portion of the CLI measurement resource comprises: refraining from measuring or filtering the CLI in an entirety of the CLI measurement resource.

Clause 11. The method of any of clauses 1 to 10, wherein the refraining from measuring or filtering the CLI in the at least the portion of the CLI measurement resource comprises: refraining from measuring or filtering the CLI in one or more groups of symbols of the CLI measurement resource over an entire bandwidth of the CLI measurement resource, the indication identifying the one or more groups of symbols.

Clause 12. The method of any of clauses 1 to 11, wherein the refraining from measuring or filtering the CLI in the at least the portion of the CLI measurement resource comprises: refraining from measuring or filtering the CLI in a set of symbols of the CLI measurement resource over one or more groups of RBs in the CLI measurement resource, the indication identifying the one or more groups of RBs.

Clause 13. The method of any of clauses 1 to 12, wherein the indication identifies whether to refrain from measuring or filtering the CLI in the at least the portion of the CLI measurement resource occurring prior to reception of the indication.

Clause 14. The method of clause 13, wherein the indication is received in downlink control information (DCI) including a DCI format associated with downlink preemption, and the CLI measurement resource includes a duration of time equal to a periodicity of a search space set associated with the DCI.

Clause 15. The method of any of clauses 1 to 12, wherein the indication identifies whether to refrain from measuring or filtering the CLI in the at least the portion of the CLI measurement resource occurring after reception of the indication.

Clause 16. The method of any of clauses 1 to 15, wherein the indication is received in a message having a cyclic redundancy check (CRC) scrambled by a radio network temporary identifier (RNTI) associated with CLI measurement.

Clause 17. The method of clause 16, wherein the message includes downlink control information (DCI) including a DCI format associated with downlink preemption or uplink cancellation, and the RNTI is different than an interruption RNTI (INT-RNTI) or a cancellation indication RNTI (CI-RNTI).

Clause 18. The method of any of clauses 1 to 17, further comprising: transmitting a capability information message indicating one or more UE capabilities to support refraining from measuring or filtering the CLI in the at least the portion of the CLI measurement resource.

Clause 19. An apparatus for wireless communication, comprising: a memory; a processor communicatively coupled with the memory, the processor operable to cause the apparatus to: receive a configuration indicating a cross link interference (CLI) measurement resource; receive an indication whether to measure or filter CLI associated with a UE in the CLI measurement resource; and refrain from measuring or filtering the CLI in at least a portion of the CLI measurement resource in response to the indication.

Clause 20. The apparatus of clause 19, wherein to refrain from measuring or filtering the CLI in the at least the portion of the CLI measurement resource, the instructions, when executed by the processor, cause the apparatus to: refrain from measuring or filtering the CLI in an entirety of the CLI measurement resource.

Clause 21. The apparatus of clause 19 or clause 20, wherein to refrain from measuring or filtering the CLI in the at least the portion of the CLI measurement resource, the instructions, when executed by the processor, cause the apparatus to: refrain from measuring or filtering the CLI in one or more groups of symbols of the CLI measurement resource over an entire bandwidth of the CLI measurement resource, the indication identifying the one or more groups of symbols.

Clause 22. The apparatus of any of clauses 19 to 21, wherein to refrain from measuring or filtering the CLI in the at least the portion of the CLI measurement resource, the instructions, when executed by the processor, cause the apparatus to: refrain from measuring or filtering the CLI in a set of symbols of the CLI measurement resource over one or more groups of RBs in the CLI measurement resource, the indication identifying the one or more groups of RBs.

Clause 23. The apparatus of any of clauses 19 to 22, wherein the instructions, when executed by the processor, further cause the apparatus to: transmit a capability information message indicating one or more UE capabilities to support refraining from measuring or filtering the CLI in the at least the portion of the CLI measurement resource.

Clause 24. A method for wireless communication performable at a network entity, comprising: transmitting a configuration indicating a cross link interference (CLI) measurement resource; transmitting an indication whether a first UE is to measure or filter CLI associated with a second UE in the CLI measurement resource; and receiving, from the first UE, a CLI measurement associated with at least a portion of the CLI measurement resource, the CLI measurement excluding the CLI in a remainder of the CLI measurement resource in response to the indication.

Clause 25. The method of clause 24, wherein the remainder of the CLI measurement resource corresponds to an unused resource of the second UE at least for a physical uplink shared channel (PUSCH) transmission, a physical uplink control channel (PUCCH) transmission, or a sounding reference signal (SRS) transmission of the second UE.

Clause 26. The method of clause 24 or clause 25, wherein the indication is of whether to measure or filter the CLI in one or more groups of symbols of the CLI measurement resource over one or more groups of resource blocks (RBs) in the CLI measurement resource, and the indication identifies the one or more groups of symbols and the one or more groups of RBs.

Clause 27. The method of any of clauses 24 to 26, wherein the receiving the CLI measurement from the first UE associated with the at least the portion of the CLI measurement resource comprises: receiving a measurement including the CLI associated with one or more groups of symbols of the CLI measurement resource over an entire bandwidth of the CLI measurement resource, the indication identifying one or more other groups of symbols for the first UE to exclude in the CLI measurement.

Clause 28. The method of any of clauses 24 to 27, wherein the receiving the CLI measurement from the first UE associated with the at least the portion of the CLI measurement resource comprises: receiving a measurement including the CLI associated with a set of symbols of the CLI measurement resource over one or more groups of RBs in the CLI measurement resource, the indication identifying one or more other groups of RBs for the first UE to exclude in the CLI measurement.

Clause 29. The method of any of clauses 24 to 28, further comprising: receiving a capability information message indicating one or more capabilities of the first UE to support refraining from measuring or filtering the CLI in the CLI measurement resource.

Clause 30. An apparatus for wireless communication, comprising: a memory; a processor communicatively coupled with the memory, the processor operable to cause the apparatus to: transmit a configuration indicating a cross link interference (CLI) measurement resource; transmit an indication whether a first UE is to measure or filter CLI associated with a second UE in the CLI measurement resource; and receive, from the first UE, a CLI measurement associated with at least a portion of the CLI measurement resource, the CLI measurement excluding the CLI in a remainder of the CLI measurement resource in response to the indication.

What is claimed is:

1. A method for wireless communication performable at a first UE, comprising:
   receiving a configuration indicating a cross link interference (CLI) measurement resource;
   receiving an indication whether to measure or filter CLI associated with a second UE in the CLI measurement resource, wherein the indication further identifies whether to refrain from measuring or filtering the CLI in at least a portion of the CLI measurement resource occurring prior to reception of the indication; and
   refraining from measuring or filtering the CLI in the at least a portion of the CLI measurement resource in response to the indication.

2. The method of claim 1, wherein the at least the portion of the CLI measurement resource corresponds to an unused resource of the second UE at least for a physical uplink shared channel (PUSCH) transmission, a physical uplink control channel (PUCCH) transmission, or a sounding reference signal (SRS) transmission of the second UE.

3. The method of claim 1, wherein the CLI measurement resource includes a CLI received signal strength indicator (CLI-RSSI) resource or a sounding reference signal (SRS) resource.

4. The method of claim 1, wherein the indication is received in downlink control information (DCI) or a medium access control (MAC) control element (MAC-CE).

5. The method of claim 1, wherein the indication is of whether to measure or filter the CLI in one or more groups of symbols of the CLI measurement resource over an entire bandwidth of the CLI measurement resource, and the indication identifies the one or more groups of symbols.

6. The method of claim 1, wherein the indication is of whether to measure or filter the CLI in one or more groups of symbols of the CLI measurement resource over one or more groups of resource blocks (RBs) in the CLI measurement resource, and the indication identifies the one or more groups of symbols and the one or more groups of RBs.

7. The method of claim 6, wherein the indication is received in downlink control information (DCI) including a DCI format associated with downlink preemption.

8. The method of claim 6, wherein the indication is received in downlink control information (DCI) including a DCI format associated with uplink cancellation.

9. The method of claim 1, wherein the refraining from measuring or filtering the CLI in the at least the portion of the CLI measurement resource comprises:

refraining from measuring or filtering the CLI in an entirety of the CLI measurement resource.

10. The method of claim 1, wherein the refraining from measuring or filtering the CLI in the at least the portion of the CLI measurement resource comprises:

refraining from measuring or filtering the CLI in one or more groups of symbols of the CLI measurement resource over an entire bandwidth of the CLI measurement resource, the indication identifying the one or more groups of symbols.

11. The method of claim 1, wherein the refraining from measuring or filtering the CLI in the at least the portion of the CLI measurement resource comprises:

refraining from measuring or filtering the CLI in a set of symbols of the CLI measurement resource over one or more groups of RBs in the CLI measurement resource, the indication identifying the one or more groups of RBs.

12. The method of claim 1, wherein the indication is received in downlink control information (DCI) including a DCI format associated with downlink preemption, and the CLI measurement resource includes a duration of time equal to a periodicity of a search space set associated with the DCI.

13. The method of claim 1, wherein the indication further identifies whether to refrain from measuring or filtering the CLI in the at least the portion of the CLI measurement resource occurring after reception of the indication.

14. The method of claim 1, wherein the indication is received in a message having a cyclic redundancy check (CRC) scrambled by a radio network temporary identifier (RNTI) associated with CLI measurement.

15. The method of claim 14, wherein the message includes downlink control information (DCI) including a DCI format associated with downlink preemption or uplink cancellation, and the RNTI is different than an interruption RNTI (INT-RNTI) or a cancellation indication RNTI (CI-RNTI).

16. The method of claim 1, further comprising:

transmitting a capability information message indicating one or more UE capabilities to support refraining from measuring or filtering the CLI in the at least the portion of the CLI measurement resource.

17. An apparatus for wireless communication, comprising:

a memory; and a processor communicatively coupled with the memory, the processor operable to cause the apparatus to:

receive a configuration indicating a cross link interference (CLI) measurement resource;

receive an indication whether to measure or filter CLI associated with a UE in the CLI measurement resource, wherein the indication further identifies whether to refrain from measuring or filtering the CLI in at least a portion of the CLI measurement resource occurring prior to reception of the indication; and refrain from measuring or filtering the CLI in the at least a portion of the CLI measurement resource in response to the indication.

18. The apparatus of claim 17, wherein to refrain from measuring or filtering the CLI in the at least the portion of the CLI measurement resource, the processor is operable to cause the apparatus to:

refrain from measuring or filtering the CLI in an entirety of the CLI measurement resource.

19. The apparatus of claim 17, wherein to refrain from measuring or filtering the CLI in the at least the portion of the CLI measurement resource, the processor is operable to cause the apparatus to:

refrain from measuring or filtering the CLI in one or more groups of symbols of the CLI measurement resource over an entire bandwidth of the CLI measurement resource, the indication identifying the one or more groups of symbols.

20. The apparatus of claim 17, wherein to refrain from measuring or filtering the CLI in the at least the portion of the CLI measurement resource, the processor is operable to cause the apparatus to:

refrain from measuring or filtering the CLI in a set of symbols of the CLI measurement resource over one or more groups of RBs in the CLI measurement resource, the indication identifying the one or more groups of RBs.

21. The apparatus of claim 17, the processor is operable to further cause the apparatus to:

transmit a capability information message indicating one or more UE capabilities to support refraining from measuring or filtering the CLI in the at least the portion of the CLI measurement resource.

22. A method for wireless communication performable at a network entity, comprising:

transmitting a configuration indicating a cross link interference (CLI) measurement resource;

transmitting an indication whether a first UE is to measure or filter CLI associated with a second UE in the CLI measurement resource, wherein the indication further identifies whether the first UE is to refrain from measuring or filtering the CLI in at least a portion of the CLI measurement resource occurring prior to reception of the indication; and receiving, from the first UE, a CLI measurement associated with the at least a portion of the CLI measurement resource, the CLI measurement excluding the CLI in a remainder of the CLI measurement resource in response to the indication.

23. The method of claim 22, wherein the remainder of the CLI measurement resource corresponds to an unused resource of the second UE at least for a physical uplink shared channel (PUSCH) transmission, a physical uplink control channel (PUCCH) transmission, or a sounding reference signal (SRS) transmission of the second UE.

24. The method of claim 22, wherein the indication is of whether to measure or filter the CLI in one or more groups of symbols of the CLI measurement resource over one or more groups of resource blocks (RBs) in the CLI measurement resource, and the indication identifies the one or more groups of symbols and the one or more groups of RBs.

25. The method of claim 22, wherein the receiving the CLI measurement from the first UE associated with the at least the portion of the CLI measurement resource comprises:

receiving a measurement including the CLI associated with one or more groups of symbols of the CLI measurement resource over an entire bandwidth of the CLI measurement resource, the indication identifying one or more other groups of symbols for the first UE to exclude in the CLI measurement.

26. The method of claim 22, wherein the receiving the CLI measurement from the first UE associated with the at least the portion of the CLI measurement resource comprises:

receiving a measurement including the CLI associated with a set of symbols of the CLI measurement resource over one or more groups of RBs in the CLI measurement resource, the indication identifying one or more other groups of RBs for the first UE to exclude in the CLI measurement.

27. The method of claim 22, further comprising:

receiving a capability information message indicating one or more capabilities of the first UE to support refraining from measuring or filtering the CLI in the CLI measurement resource.

28. An apparatus for wireless communication, comprising:

a memory; and a processor communicatively coupled with the memory, the processor operable to cause the apparatus to:

transmit a configuration indicating a cross link interference (CLI) measurement resource;

transmit an indication whether a first UE is to measure or filter CLI associated with a second UE in the CLI measurement resource, wherein the indication further identifies whether the first UE is to refrain from measuring or filtering the CLI in at least a portion of the CLI measurement resource occurring prior to reception of the indication; and receive, from the first UE, a CLI measurement associated with the at least a portion of the CLI measurement resource, the CLI measurement excluding the CLI in a remainder of the CLI measurement resource in response to the indication.

* * * * *